United States Patent
Shidochi et al.

(10) Patent No.: US 6,693,856 B1
(45) Date of Patent: Feb. 17, 2004

(54) MAGNETO-OPTICAL DISK APPARATUS CAPABLE OF ACCURATE REPRODUCTION OF SIGNAL BY REMOVING MAGNETIC INFLUENCE BY MAGNET INCLUDED IN OPTICAL HEAD AND METHOD OF DETECTING INTENSITY OF MAGNETIC FIELD APPLIED BY MAGNET

(75) Inventors: Masaaki Shidochi, Anpachi-gun (JP); Kanichi Koyama, Fuwa-gun (JP); Yoichi Tsuchiya, Hashima (JP); Mitsuhiko Maeda, Takatsuki (JP); Seiji Kajiyama, Ibi-gun (JP); Seiichiro Takahashi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/953,194

(22) Filed: Sep. 17, 2001

(30) Foreign Application Priority Data

Sep. 18, 2000 (JP) .................................. 2000-281211 (P)
Sep. 29, 2000 (JP) .................................. 2000-298847 (P)

(51) Int. Cl.[7] .............................................. G11B 7/085
(52) U.S. Cl. .................................. 369/30.15; 369/13.17
(58) Field of Search ........................... 369/30.15, 30.17

(56) References Cited

U.S. PATENT DOCUMENTS

| | | | | |
|---|---|---|---|---|
| 5,126,983 A | * | 6/1992 | Ikegame et al. ......... | 369/13.15 |
| 5,444,678 A | * | 8/1995 | Ogata ...................... | 369/13.23 |
| 5,602,807 A | * | 2/1997 | Taguchi .................. | 369/13.17 |
| 5,617,379 A | * | 4/1997 | Shinozaki et al. ....... | 369/13.15 |
| 5,636,187 A | * | 6/1997 | Fujii ....................... | 369/13.15 |
| 5,687,141 A | * | 11/1997 | Ishii ....................... | 369/13.15 |
| 6,377,528 B1 | * | 4/2002 | Asano ..................... | 369/53.31 |

FOREIGN PATENT DOCUMENTS

WO          WO98/43241          * 10/1998

* cited by examiner

Primary Examiner—Aristotelis M. Psitos
(74) Attorney, Agent, or Firm—Armstrong, Kratz, Quintos, Hanson & Brooks, LLP

(57) ABSTRACT

A magneto-optical disk apparatus includes a magnetic head in a position opposed to an objective lens included in an optical head with a magneto-optical record medium therebetween. The magneto-optical disk apparatus includes a magnet for cancelling a first magnetic field emitted toward the magnetic head from a magnet for focus servo-control or tracking servo-control of the objective lens. The magnet emits a second magnetic field in a direction toward the magnetic head. The second magnetic field is opposite in direction to the first magnetic field, and has the same intensity as the first magnetic field. Consequently, the signal can be accurately reproduced from the magneto-optical record medium while removing a magnetic influence from the magnet included in the optical head.

4 Claims, 21 Drawing Sheets

MAGNETO-OPTICAL DISK APPARATUS CAPABLE OF ACCURATE REPRODUCTION OF SIGNAL BY REMOVING MAGNETIC INFLUENCE BY MAGNET INCLUDED IN OPTICAL HEAD AND METHOD OF DETECTING INTENSITY OF MAGNETIC FIELD APPLIED BY MAGNET

BACKGROUND OF THE INVENTION

1. Field of the Invention

The present invention relates to a magneto-optical disk apparatus, which can accurately reproduce a signal by removing a magnetic influence applied from a magnet for servo-control of an objective lens for converging laser beams onto a magneto-optical record medium. The present invention also relates to a magnetic field intensity detecting method of detecting an intensity of an influence magnetic field applied from a magnet for servo-control.

2. Description of the Related Art

Magneto-optical record mediums have received widespread attention as record mediums, which are rewritable and have large storage capacities and high reliability, and are being used as computer memories and others. Recently, a magneto-optical record medium having a storage capacity of 6.0 Gbytes is standardized as AS-MO (Advanced Storage Magneto Optical disk) and practical use thereof is starting.

A signal is recorded on the magneto-optical record medium in such a manner that a magnetic head is initially in contact with a surface of a side of the magneto-optical record medium provided with a magnetic layer, and a magnetic field modulated with the record signal (i.e., signal to be recorded) is applied to the magnetic layer of the magneto-optical record medium while floating the magnetic head by rotating the magneto-optical record medium at a predetermined rotation speed. Laser beams are emitted to a side remote from the magnetic head for heating a predetermined region of the magnetic layer of the magneto-optical record medium to or above a predetermined temperature. Thereby, magnetic domains, which are magnetized in different directions in response to the record signal, are formed on the record layer of the magnetic layer to record the signal.

For reproducing the signal from the magneto-optical record medium, the magnetic domains on the regions, which are heated to or above the predetermined temperature by laser beam irradiation, are transferred onto the reproduction layer and the magnetic domains thus transferred are detected as a rotation angle of a plane of polarization of the laser beams. Thereby, the signals are reproduced from the magneto-optical record medium. In this case, the magnetic head is disposed on the side opposite to the side irradiated with the laser beams. When reproducing the signal, the magnetic head is not in contact with the magneto-optical record medium, and is spaced from the magneto-optical record medium.

When the signal recorded on the magneto-optical record medium is to be reproduced such a manner is employed for quick reproduction of the signal that the magnetic head is kept in contact with the magneto-optical record medium, and the side opposite to the magnetic head is irradiated with the laser beams for reproducing the signal.

When the signal is reproduced from the magneto-optical record medium while keeping the magnetic head in contact with the magneto-optical record medium, a magnetic force applied from a magnet, which is used for focus servo-control or tracking servo-control of an objective lens for converging the laser beams onto the magneto-optical record medium, concentrates on a core (made of a magnetic material such as ferrite) of the magnetic head, and thus exerts an adverse effect on the reproduced signal.

SUMMARY OF THE INVENTION

Accordingly, an object of the invention is to provide a magneto-optical disk apparatus, which can reproduce signals from a magneto-optical record medium while removing an influence of a magnetic field, which is concentratedly applied to a core of a magnetic head from a magnet performing focus servo-control or tracking servo-control of an object lens.

Another object of the invention is to provide a magnetic field intensity detecting method of detecting an intensity of a magnetic field, which is concentratedly applied to a core of a magnetic head from a magnet performing focus servo-control or tracking servo-control of an object lens.

The invention provides a magneto-optical disk apparatus for recording a signal on a magneto-optical record medium with a laser beam and a magnetic field, and reproducing the signal from the magneto-optical record medium with the laser beam including a magnetic head for applying a magnetic field to the magneto-optical record medium; a lowering device for lowering the magnetic head to a position in contact with the magneto-optical record medium; an optical head disposed on a side remote from the magnetic head with the magneto-optical record medium therebetween, and including an objective lens for converging the laser beam onto the magneto-optical record medium, a first magnet for performing tracking servo-control of the objective lens and a second magnet for performing focus servo-control of the objective lens; and a third magnet for cancelling a leaked magnetic field produced by at least one of the first and second magnets and convergently applied toward the magnetic head.

In the above magneto-optical disk apparatus according to the invention, the magnetic head is lowered by the lowering device, and comes into contact with the magneto-optical record medium. When the magneto-optical record medium turns, the magnetic head floats from the magneto-optical record medium. The third magnet cancels the magnetic influence, which may be exerted on the magneto-optical record medium by the first or second magnets included in the optical head for performing the tracking servo-control of the objective lens or the focus servo-control thereof. While floating the magnetic head from the magneto-optical record medium, recording and/or reproducing of the signal on the magneto-optical record medium are performed. According to the invention, therefore, the recording and/or reproducing of the signal on the magneto-optical record medium can be accurately performed while keeping the magnetic head in contact with the magneto-optical record medium.

Preferably, the third magnet emits the magnetic field of an intensity determined by a magnetic field intensity detecting method using a DC magnetic field, and the magnetic field intensity detecting method includes a first step of irradiating the magneto-optical record medium with the laser beam, and reproducing the signal from the magneto-optical record medium by applying a DC magnetic field in a first direction to a point irradiated with the laser beam while changing an intensity of the DC magnetic field, a second step of detecting the number of errors in the signal reproduced in the first step, a third step of reproducing the signal from the magneto-optical record medium by applying a DC magnetic field in a second direction opposite to the first direction onto the irradiation point, a fourth step of detecting the number of errors in the signal reproduced in the third step, and a fifth step of detecting an intensity of the magnetic field applied from the first or second magnet at the irradiation point based on a relationship between the error numbers detected in the second and fourth steps and the intensities of the DC magnetic fields.

The magnetic head is lowered by the lowering device to make contact with the magnetic-optical record medium. When the magneto-optical record medium turns, the magnetic head floats from the magneto-optical record medium. The third magnet cancels the magnetic influence, which is applied to the magneto-optical record medium by the first magnet for tracking servo-control of the objective lens included in the optical head or the second magnet for the focus servo-control of the objective lens. While keeping the magnetic head in a position floated from the magneto-optical record medium, recording and/or reproducing of the signal on the magneto-optical record medium are performed. The intensity of the magnetic field emitted from the third magnet is determined to be equal to the magnetic field intensity, which is detected based on the relationship between the number of errors in the signal reproduced by applying the DC magnetic field to the magneto-optical record medium and the intensity of the DC magnetic field. According to the invention, therefore, the recording and/or reproducing of the signal on the magneto-optical record medium can be accurately performed while keeping the magnetic head in contact with the magneto-optical record medium.

Preferably, the third magnet of the magneto-optical disk apparatus is arranged in the radial direction of the magneto-optical record medium, and has a length longer than a range of radial movement of the optical head.

When the optical head moves in the radial direction of the magneto-optical record medium in a seek operation or the like, the first and second magnets included in the optical head change their positions. Even in this case, the third magnet removes the magnetic influence exerted by the first or second magnet. According to the invention, therefore, the signal can be accurately reproduced while removing the magnetic influence exerted from the magnet, which is included in the optical head, even when the optical head moves in the radial direction of the magneto-optical record medium.

Preferably, the third magnet of the magneto-optical disk apparatus is arranged on the same side as the optical head with respect to the magneto-optical record medium.

A magnetic flux coming from the first or second magnet included in the optical head enters the third magnet arranged on the same side as the optical head with respect to the magneto-optical record medium. According to the invention, therefore, it is possible to eliminate the magnetic influence by the magnet included in the optical head even if the third magnet is arranged on the same side as the optical head with respect to the magneto-optical record medium.

Preferably, the third magnet of the magneto-optical disk apparatus is arranged on the same side as the magnetic head with respect to the magneto-optical record medium.

The magnetic flux coming from the first or second magnet included in the optical head is cancelled by the magnetic flux coming from the third magnet arranged on the side opposite to the optical head with respect to the magneto-optical record medium. According to the invention, therefore, it is possible to eliminate the magnetic influence by the magnet included in the optical head even if the third magnet is arranged on the side opposite to the optical head with respect to the magneto-optical record medium.

Preferably, the third magnet of the magneto-optical disk apparatus has a plate form having first and second planes, and emits from the first plane the magnetic field for cancelling the leaked magnetic flux caused by the first or second magnet.

The third magnet for eliminating the magnetic influence by the first or second magnet included in the optical head has a plate form, and emits the magnetic flux from the plane of the plate form. According to the invention, therefore, the third magnet for removing the magnetic influence by the first or second magnet included in the optical head can be easily attached.

Preferably, the magneto-optical disk apparatus further includes an outer appearance member for covering a loading portion of the magneto-optical record medium, and the third magnet is arranged on the outer appearance member through the second plane.

Once the position of the third magnet for removing the magnetic influence by the first or second magnet included in the optical head is adjusted, the third magnet will remove the magnetic influence by the first or second magnet. According to the invention, therefore, the magnetic influence by the first or second magnet can be stably removed.

Preferably, the third magnet of the magneto-optical disk apparatus is arranged on the outer appearance member, and a magnetic field leakage preventing member for preventing external leakage of the magnetic field from the second plane is interposed between the third magnet and the outer appearance member.

The magnetic field leak preventing member prevents the external leakage of the magnetic field through the outer appearance member. According to the invention, therefore, the signal is not erased even when the magneto-optical record medium or the like is located near the magneto-optical disk apparatus.

Preferably, the magnetic field leakage preventing member is made of metal.

The magnetic field leakage preventing member prevents the external leakage of the magnetic field through the outer appearance member, and further removes the magnetic influence caused by the first or second magnet included in the optical head so that it enhances the magnetic flux emitted from the third magnet. According to the invention, therefore, a magnet of a small magnetic flux density can be used for removing the magnetic influence by the first or second magnet included in the optical head.

The invention also provides a magneto-optical disk apparatus for detecting an intensity of an influence magnetic field, which is exerted on an irradiation point of a laser beam by a magnet employed for servo-control of an objective lens for irradiating a magneto-optical record medium with the laser beam, recording a signal on the magneto-optical record medium with the laser beam and the magnetic field, and/or reproducing the signal from the magneto-optical record medium with the laser beam. The magneto-optical disk apparatus includes a first magnetic head for applying the magnetic field to the magneto-optical record medium; a lowering device for lowering the first magnetic head to a position in contact with the magneto-optical record medium, an optical head including an objective lens arranged on the side remote from the first magnetic head with the magneto-optical record medium therebetween for converging the laser beam to the magneto-optical record medium, and the magnet; a second magnetic head for cancelling the influence magnetic field; a magnetic head drive circuit for driving said first or second magnetic head; and a control circuit. When detecting the intensity of the influence magnetic field, the control circuit controls the magnetic head drive circuit such that the first magnetic head applies a DC magnetic field in a first direction or a DC magnetic field in a second direction opposite to said first direction to said magneto-optical record medium while changing the intensity of the DC magnetic field. The control circuit determines the intensity of the influence magnetic field based on the number of errors in a reproduced signal detected by the optical head under the DC magnetic field. The magnetic head drive circuit drives the first magnetic head to apply the DC magnetic field to the magneto-optical record medium under control by the control circuit. The optical head detects the signal on the magneto-optical record medium. When producing the signal, the control circuit controls the magnetic head drive circuit to produce by the second magnetic head the magnetic field of the same intensity as the determined intensity of the influence magnetic field. The magnetic head drive circuit drives the second magnetic head to produce the magnetic field of the same intensity as the influence magnetic field under the control by the control circuit.

According to the above magneto-optical disk apparatus of the invention, when the intensity of the influence magnetic field, which is applied from the magnet for servo-control of the objective lens, is to be detected, the control circuit controls the magnetic head drive circuit to produce the DC magnetic field of a changed intensity from the first magnetic head. The optical head reproduces the signal from the magneto-optical record medium under the DC magnetic field, and the number of errors in the reproduced signal is detected. The above operation is performed for the DC magnetic fields in the two directions. The control circuit receives the detected number of errors, and obtains the relationship between the number of errors and the intensity of the DC magnetic field. The control circuit obtains the magnetic field intensity exhibiting a lateral symmetry, and determines the intensity of the influence magnetic field.

When reproducing the signal, the control circuit controls the magnetic head drive circuit to produce by the second magnetic head the magnetic field of the same intensity as the determined influence magnetic field intensity, and the magnetic head drive circuit drives the second magnetic head under the control by the control circuit so that the second magnetic head produces the magnetic field of the same intensity as the influence magnetic field. According to the invention, therefore, the magnetic field for cancelling the influence magnetic field can be produced based on the measured intensity of the influence magnetic field. As a result, the recording and/or reproducing of the signal on the magneto-optical record medium can be accurately performed.

The invention provides a method of detecting a magnetic field intensity for detecting an intensity of a magnetic field applied onto an irradiation point of a laser beam by a magnet employed for servo-control of an objective lens for irradiating a magneto-optical record medium with the laser beam. The method includes a first step of emitting the laser beam to the magneto-optical record medium and simultaneously applying a DC magnetic field in a first direction to the irradiation point while changing the intensity of the DC magnetic field to reproduce the signal from the magneto-optical record medium; a second step of detecting the number of errors in the reproduced signal reproduced in the first step; a third step of applying a DC magnetic field in a second direction opposite to the first direction to the irradiation point to reproduce the signal from the magneto-optical record medium; a fourth step of detecting the number of errors an the reproduced signal reproduced in the third step; and a fifth step of detecting an intensity of an influence magnetic field exerted on the irradiation point by the magnet based on the relationship between the number of errors detected in the second and fourth steps and the intensities of the DC magnetic fields.

According to the above method of detecting the magnetic field intensity of the invention, the laser beam is emitted to the magneto-optical record medium, and the DC magnetic field is applied while changing the intensity on the irradiation point of the laser beam. The number of errors in the reproduced signal is detected. This detection of the number of errors is performed for the cases of applying the DC magnetic fields in the two directions, respectively and the intensity of the influence magnetic field is determined from the relationship between the numbers of errors in the reproduced signal and the intensities of the DC magnetic fields. According to the invention, therefore, the DC magnetic field is applied to the magneto-optical record medium to detect the number of errors in the reproduced signal, whereby the intensity of the influence magnetic field applied from the magnet for servo-control of the objective lens can be easily detected.

Preferably, in the relationship between the detected number of the errors and the intensity of the DC magnetic field, the intensity of the first magnetic field starting increase in number of the errors during increase in intensity of the DC magnetic field in the first direction and the intensity of the second magnetic field starting increase in number of the errors during increase in intensity of the DC magnetic field in the second direction are detected, and the average value between the detected intensities of the first and second magnetic fields is determined as the intensity of the influence magnetic field.

In the relationship between the number of errors in the reproduced signal and the intensity of the DC magnetic field, rapid increase in number of the errors occurs at two values of the DC magnetic field intensity. The two values of the DC magnetic field intensity are detected, and the average value between them is calculated to determine the intensity of the influence magnetic field. According to the invention, therefore, the intensity of the influence magnetic field can be easily and accurately determined.

Preferably, a random data pattern recorded on the magneto-optical record medium is reproduced in the first and third steps.

Since the random data pattern recorded on the magneto-optical record medium is reproduced, and the intensity of the influence magnetic field is determined based on the number of errors in the signal thus reproduced. According to the invention, therefore, it is not necessary to record and reproduce data of a specific pattern used for detecting the intensity of the influence magnetic field on and from the magneto-optical record medium so that the intensity of the influence magnetic field can be easily determined.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. The same or corresponding portions bear the same reference numbers, and description thereof is not repeated.

First Embodiment

Figure 1:
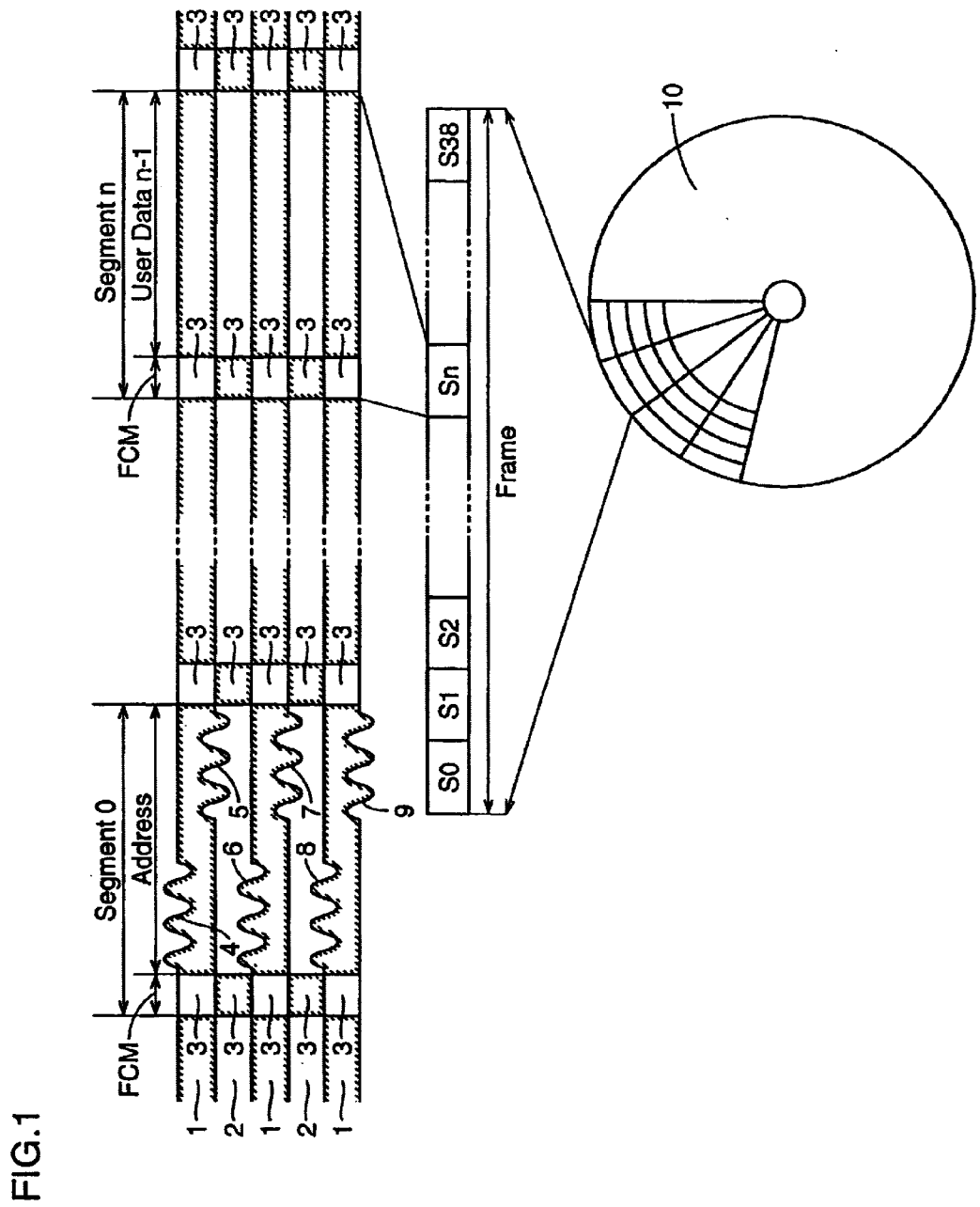
FIG. 1 shows a data format of a magneto-optical record medium to be used for recording and reproducing data by a magneto-optical disk apparatus.
Figure 2:
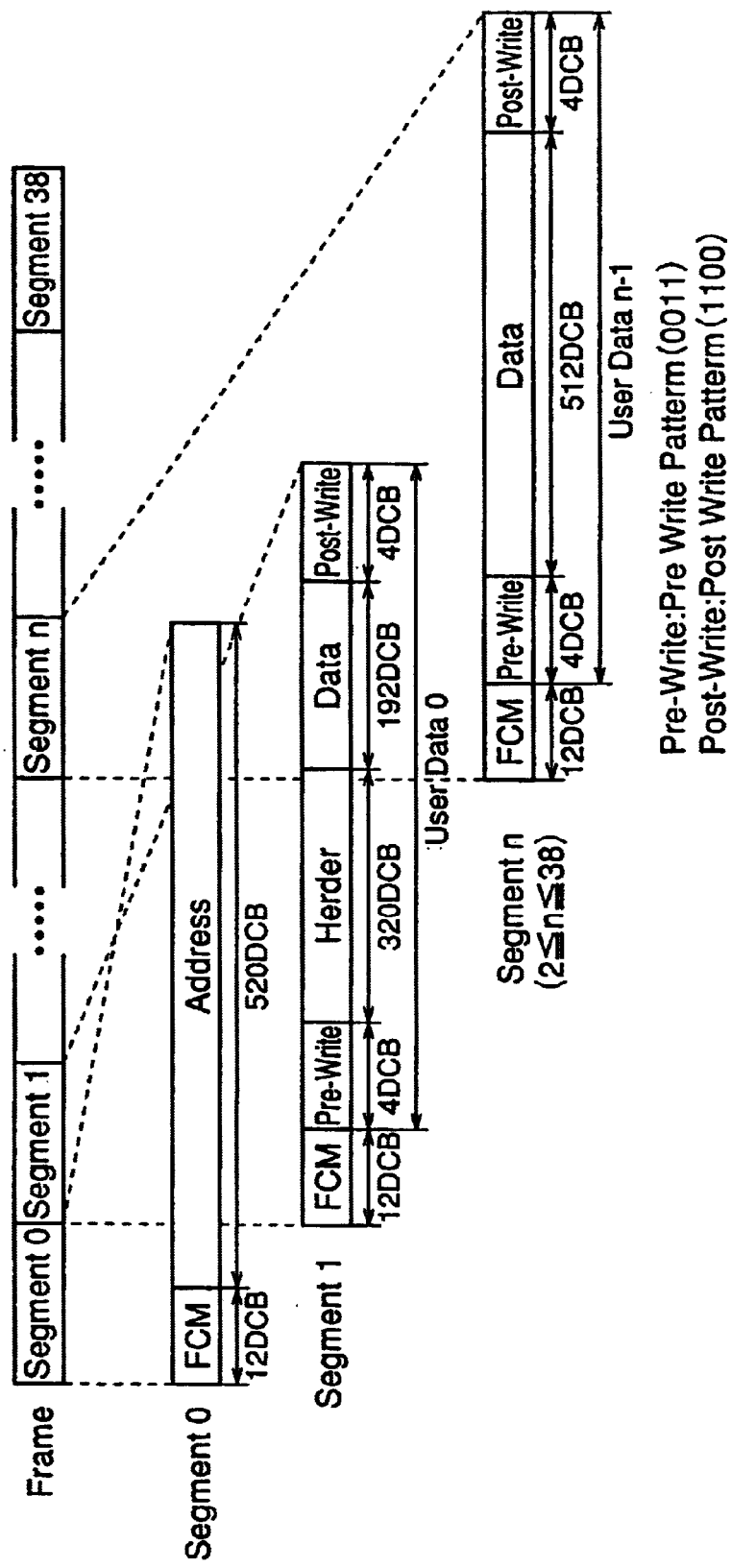
FIG. 2 shows a segment structure of the magneto-optical record medium shown in FIG. 1.

Referring to FIGS. 1 and 2, description will now be given on a magneto-optical record medium, on which recording and/or reproducing of signals are to be performed.

Referring to FIG. 1, a magneto-optical record medium 10 is provided with frames (Frame), which are equally spaced from each other and form record units, respectively. Each frame is formed of 39 segments (Segment) S0, S1, S2, . . . and S38.

Magneto-optical record medium 10 has a planar structure having grooves 1 and lands 2, which are arranged radially alternately to each other, and are formed in spiral or concentric forms. Each segment has a length of 532 DCBs (Data Channel Bits), and is provided at its leading end with a fine clock mark (FCM: Fine Clock Mark) 3 indicating phase information of a clock used for recording and reproducing data. Fine clock marks 3 are formed by providing lands each having a constant length on groove 1 at constant intervals, and providing grooves each having a constant length on land 2 at constant intervals. Segment S0 forming the leading end of the frame bears address information (Address) following fine clock mark 3 for representing an address on magneto-optical record medium 10. The address information (Address) is preformatted with wobbles 4–9 at the time of production of magneto-optical record medium 10.

Wobbles 4 and 5 are formed on the opposite walls of groove 1, respectively. Likewise, wobbles 6 and 7, and wobbles 8 and 9 are formed on the opposite walls of the same grooves 1, respectively. These wobbles 4 and 5 store the same address information, and wobbles 6 and 7, and 8 and 9 store the same address information. This manner of address information recording is referred to as a one-side stagger manner. By employing the one-side stagger manner, the address information can be accurately detected even when the laser beam shifts from the center of groove 1 or land 2 due to tilt or the like of magneto-optical record medium 10.

The region bearing the address information and the region provided with fine clock marks 3 are not used for recording user data. Segment Sn is formed of fine clock mark 3 and user data (User Data n–1).

Referring to FIG. 2, description will now be given on the specific structures of the segments. Among segments S0, S1, S2, . . . and S38 forming the frame, segment S0 is an address segment preformatted on magneto-optical record medium 10, and segments S1–S38 are data segments, which are reserved as regions for recording the user data. Segment S0 is formed of a fine clock mark region FCM of 12 DCBs and address Address of 520 DCBs. Segment S1 is formed of fine clock mark region FCM of 12 DCBs, Pre-Write of 4 DCBs, Data of 512 DCBs and Post-Write of 4 DCBs.

Pre-Write represents the start of data writing, and is formed of, e.g., a predetermined pattern "0011". Post-Write represents the end of data, and is formed of, e.g., a predetermined pattern "1100".

The user data region in segment S1 includes a header (Header), which is a fixed pattern, e.g., for determining a position of data in the reproducing operation, compensating a position of reproduction clock and adjusting a laser power. A fixed pattern recorded in the header is a pattern, in which DC components are suppressed and, for example, a predetermined number of domains each having a length of 2T and spaced by 2T from each other as well as a predetermined number of domains each having a length of 8T and spaced by 8T from each other are recorded.

Phase compensation is performed by performing adjustment such that timing of sampling of an analog signal, which is obtained by reproducing the domains of 2T, may match with the phase of the clock used for recording and reproducing the data. The domains of 2T and 8T are reproduced. The laser power is adjusted such that the intensity of the signal obtained by reproducing the domains of 2T may exhibit a ratio of 50% or more with respect to the intensity of the signal obtained by reproducing the domains of 8T. The position determination of the data is performed in the reproducing operation by reproducing the domains of 8T and determining whether the position of a digital signal produced by converting the reproduced signal matches with the predicted position of the digital signal of the domains of 8T or not. Each of the patterns of Pre-Write, Post-Write and Header is recorded continuously to the user data when recording the user data.

Figure 3:
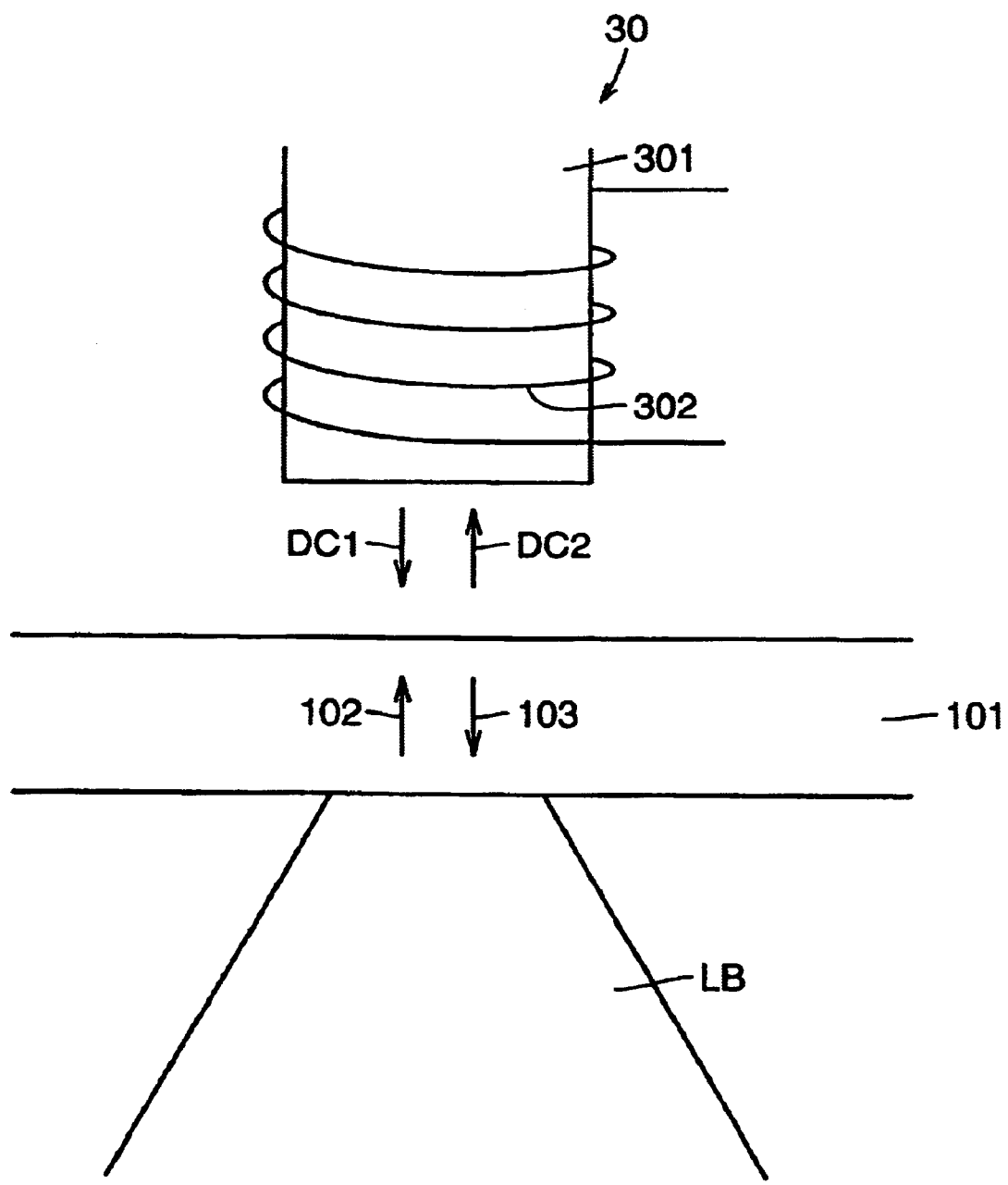
FIG. 3 shows a manner of detecting an intensity of an influence magnetic field from magnets for servo-control of an objective lens.
Figure 4:
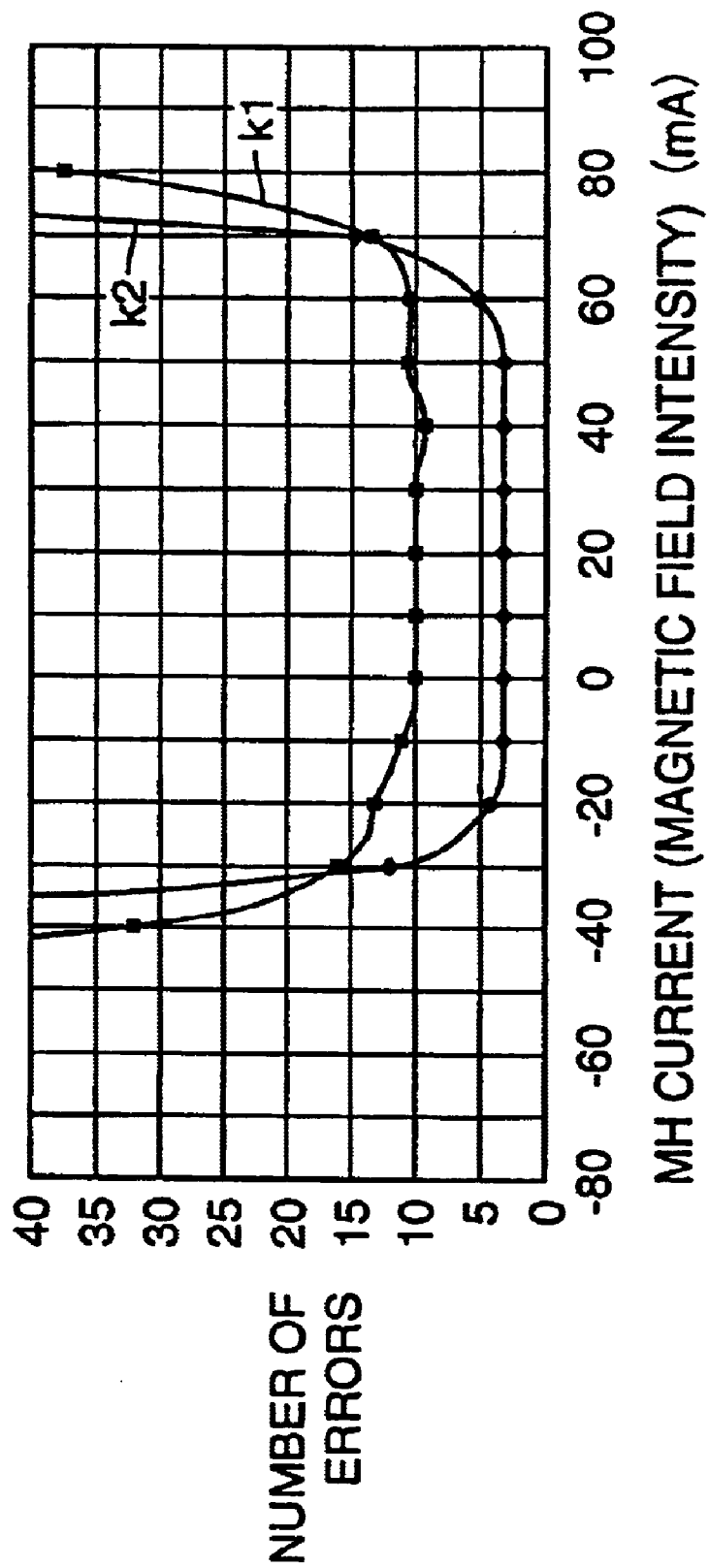
FIG. 4 shows a relationship between the number of errors in a reproduced signal and an intensity of a DC magnetic field.
Figure 5:
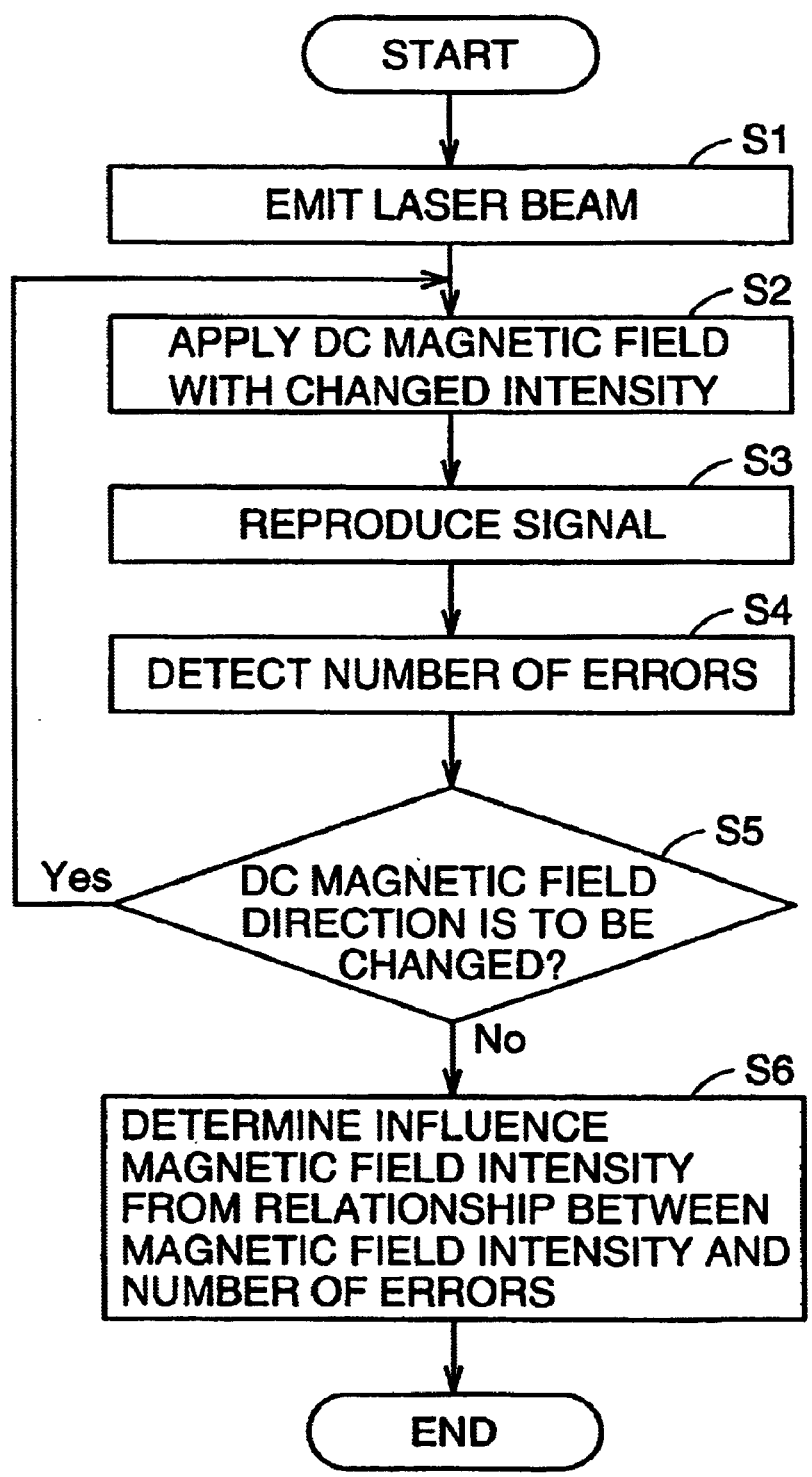
FIG. 5 is a flowchart showing an operation of detecting the intensity of the influence magnetic field applied from the magnets for servo-control of the objective lens according to the invention.

Referring to FIGS. 3–5, description will now be given on a method of detecting the magnetic field intensity according to the present invention. Referring to FIG. 3, a magnetic head 30 is formed of a core 301 and a coil 302 wound around core 301. A current in a constant direction is supplied through coil 302 so that core 301 applies DC magnetic fields DC1 and DC2 to a reproduction layer 101 of magneto-optical record medium 10. In this case, the direction and value of the current flowing through coil 302 are changed so that DC magnetic fields DC1 and DC2 of different magnitudes are applied to reproduction layer 101. From the side opposite to that, from which DC magnetic fields DC1 and DC2 are applied, an optical head 20 emits laser beams LB to detect the reproduced signal. In FIG. 3, reproduction layer 101 and laser beams LB are depicted in large sizes as compared with core 301 of magnetic head 30 for easy understanding.

Magnetic domains magnetized in different directions are formed at the record layer (not shown) of magneto-optical record medium 10, and thereby a predetermined signal is recorded in advance. This signal is formed of a random data pattern, e.g., of "10101010 . . . ". In this case, a current in a constant direction is supplied through coil 302 so that a DC magnetic field in a constant direction is applied to reproduction layer 101 of magneto-optical record medium 10. If the direction of the DC magnetic field is the same as the direction of the magnetic domains transferred onto the reproduction layer, the magnetic domain transferred onto the reproduction layer can be detected without an influence by the DC magnetic field. In the case where the domains magnetized in the direction opposite to the direction of the DC magnetic field is transferred from the record layer, the magnetic domains are detected without an influence by the DC magnetic field as long as the intensity of the DC magnetic field as in such a weak range that does not invert the magnetization of the reproduction layer. In the case where the applied DC magnetic field is strong to invert the magnetization of the reproduction layer, the magnetic domains of the direction different from that transferred to the reproduction layer is detected. Accordingly, even in the case where a random data pattern of, e.g., "10101010 . . . " is recorded, it is possible to determine the magnetic field intensity, which starts inversion of the magnetization transferred onto reproduction layer 101, by applying the DC magnetic field in the constant direction to reproduction layer 101 of magneto-optical record medium 10.

By changing the value of current supplied through coil 302, the intensities of DC magnetic fields DC1 and DC2 are changed.

When reproducing the magnetic domain having magnetization 102, the magnetic domain having magnetization 102 is transferred from the record layer onto reproduction layer 101. A current, which applies DC magnetic field DC1 onto reproduction layer 101, is supplied through coil 302. While changing the value of current flowing through coil 302, the magnetic domain transferred onto reproduction layer 101 by laser beams LB is detected, and the number of errors in the reproduced signal is measured for each current value. When reproducing the magnetic domain having a magnetization 103, a current is similarly supplied through coil 302. Thus, the current, which applies DC magnetic field DC2 onto reproduction layer 101, is supplied through coil 302. While changing the value of current flowing through coil 302, the magnetic domain transferred onto reproduction layer 101 by laser beams LB is detected, and the number of errors in the reproduced signal is measured for each current value.

Referring to FIG. 4, description will now be given regarding the relationship between the magnetic field intensity and the number of errors, which are measured in the foregoing method. A curve k1 represents a result of measurement from grooves 1 of magneto-optical record medium 10, and a curve k2 represents a result of measurement from lands 2 of magneto-optical record medium 10. In both grooves 1 and lands 2, the relationship between the number of errors and the magnetic field intensity exhibits a symmetry with respect to a certain intensity. More specifically, in grooves 1 and lands 2, the magnetic field intensity of 20 mA forms a center. In the course of decreasing the magnetic field intensity from 20 mA and applying the DC magnetic field in the opposite direction, or in the course of increasing the magnetic field intensity from 20 mA, the number of errors starts to increase rapidly when the intensity is shifted by about 50 mA from 20 mA.

If no influence were exerted from the magnets for servo-control of the objective lens, the center of the magnetic field intensity would be equal to 0 mA in accordance with the measuring principle already described with reference to FIG. 3. However, the center of the magnetic field intensity is equal to 20 mA according to the actual measurement. Therefore, it can be considered that the magnet for the servo-control of objective lens 22 exerts the magnetic field corresponding to 20 mA to the irradiation point of the laser beams. Accordingly, in the relationship shown in FIG. 4, the amount of shift from 20 mA of the magnetic field intensity, which exhibits the symmetry, is equal to the intensity of magnetic field, which is exerted from the magnet for servo-control of objective lens 22 to the irradiation point of laser beams.

Referring to FIG. 5, description will now be given on the flowchart of the method of detecting the intensity of magnetic field, which is exerted to the irradiation point of the laser beams from the magnets for servo-control of objective lens 22. When the detecting operation starts, optical head 20 emits the laser beams to magneto-optical record medium 10 (step S1). Magnetic head 30 applies the DC magnetic field in the constant direction having changed intensity to magneto-optical record medium 10 (step S2), and the signal is reproduced from magneto-optical record medium 10 (step S3). Based on the reproduced signal, the number of errors is detected (step S4). Thereby, the number of errors in the reproduced signal is detected for each intensity of the DC magnetic field. Thereafter, it is determined whether the direction of the DC magnetic field is to be changed or not (step S5). When the direction of the DC magnetic field is to be changed, the steps S2–S4 are repeated, and the number of errors in the reproduced signal is detected for the different direction of the DC magnetic field. When the numbers of errors in the reproduced signal for the magnetic field are detected in the two directions of the DC magnetic field, "No" is selected in step S5. From the relationship between the magnetic field intensity and the number of errors in reproduced signal, the intensity of magnetic field, which is exerted to the irradiation point of laser beam from the magnets for servo-control of objective lens 22, is determined (step S6). Thereby, the operation of detecting the magnetic field intensity ends.

By using the method of detecting the magnetic field intensity according to the invention, as described above, it is possible to detect easily the intensity of the influence magnetic field exerted from the magnets for servo-control of objective lens 22.

Description will now be given on a magneto-optical disk apparatus, which can record and/or reproduce signals on magneto-optical record medium 10 while removing the influence by the magnetic field, which is determined by the method of detecting the magnetic field intensity according to the invention.

Figure 6:
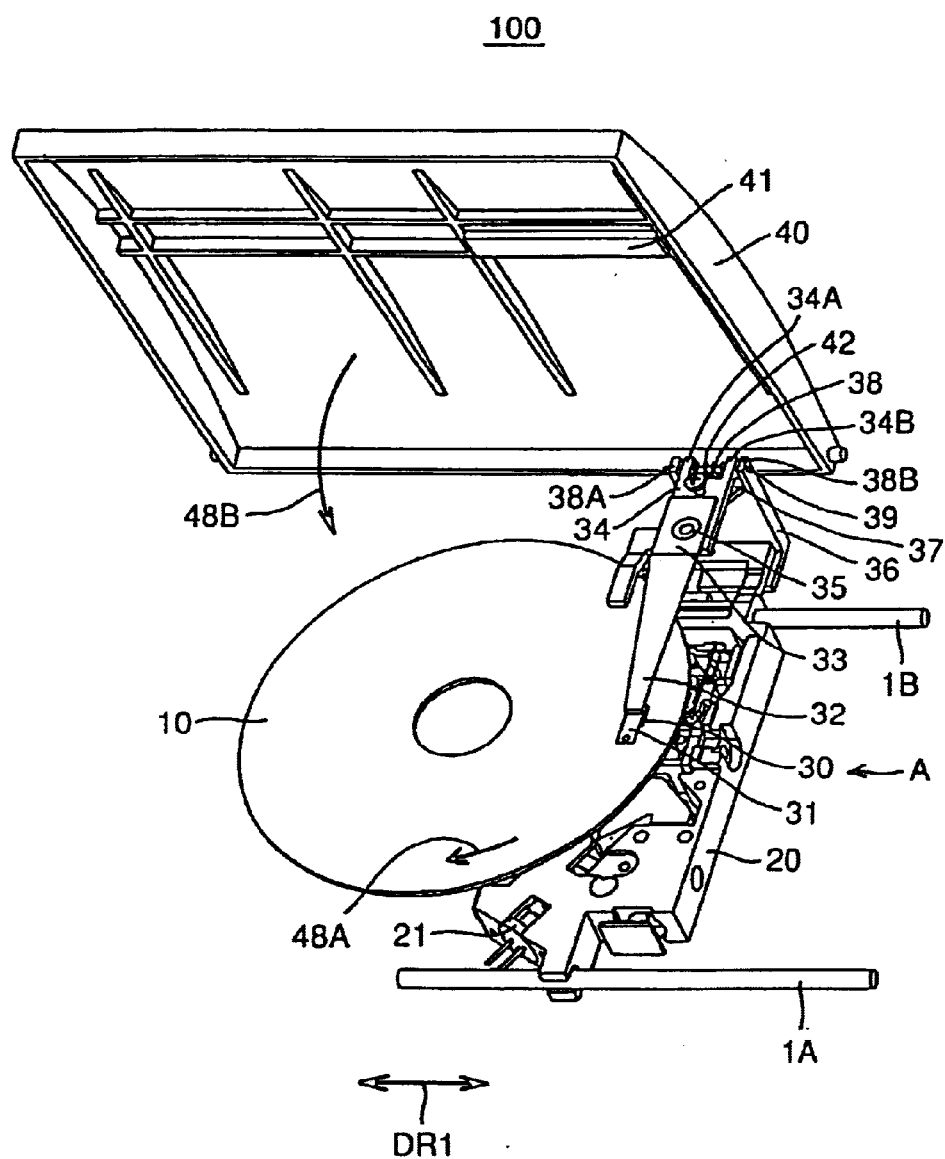
FIG. 6 is a perspective view showing a portion of the magneto-optical disk apparatus including a magnetic head and an optical head according to an embodiment of the invention.

Referring to FIG. 6, a magneto-optical disk apparatus 100 includes optical head 20, magnetic head 30 and a magnet 41. Optical head 20 includes a semiconductor laser 21, which emits laser beams converged by an objective lens (not shown in FIG. 6) onto magneto-optical record medium 10. Optical head 20 is movable along rails 1A and 1B in the radial direction DR1 of magneto-optical record medium 10.

Magnetic head 30 is arranged on the side remote from optical head 20 with magneto-optical record medium 10 therebetween. Magnetic head 30 applies a magnetic field, which is modulated with a record signal, to magneto-optical record medium 10 when recording the signal on magneto-optical record medium 10. The magnetic head 30 is attached to a slider 31. Slider 31 is fixed to a support member 33 by an arm 32 made of a plate spring. Support member 33 is fixed to a support member 34 by a screw 35. A support member 36 has an end fixed to optical head 20. Support member 36 is provided at the other end with an opening 37. Columnar members 38A and 38B are located on the opposite sides of opening 37, and are fitted with a shaft 39 extending therethrough. Support member 34 has an opening 38 at the side remote from the end fixed to support member 33. Support member 34 is provided at the opposite ends of opening 38 with columnar members 34A and 34B, which are located inside columnar members 38A and 38B of support member 36, respectively. Columnar members 34A and 34B are coupled to columnar members 38A and 38B by shaft 39. A spring 42 is arranged inside columnar members 34A and 34B, and is fitted around shaft 39.

Figure 7:
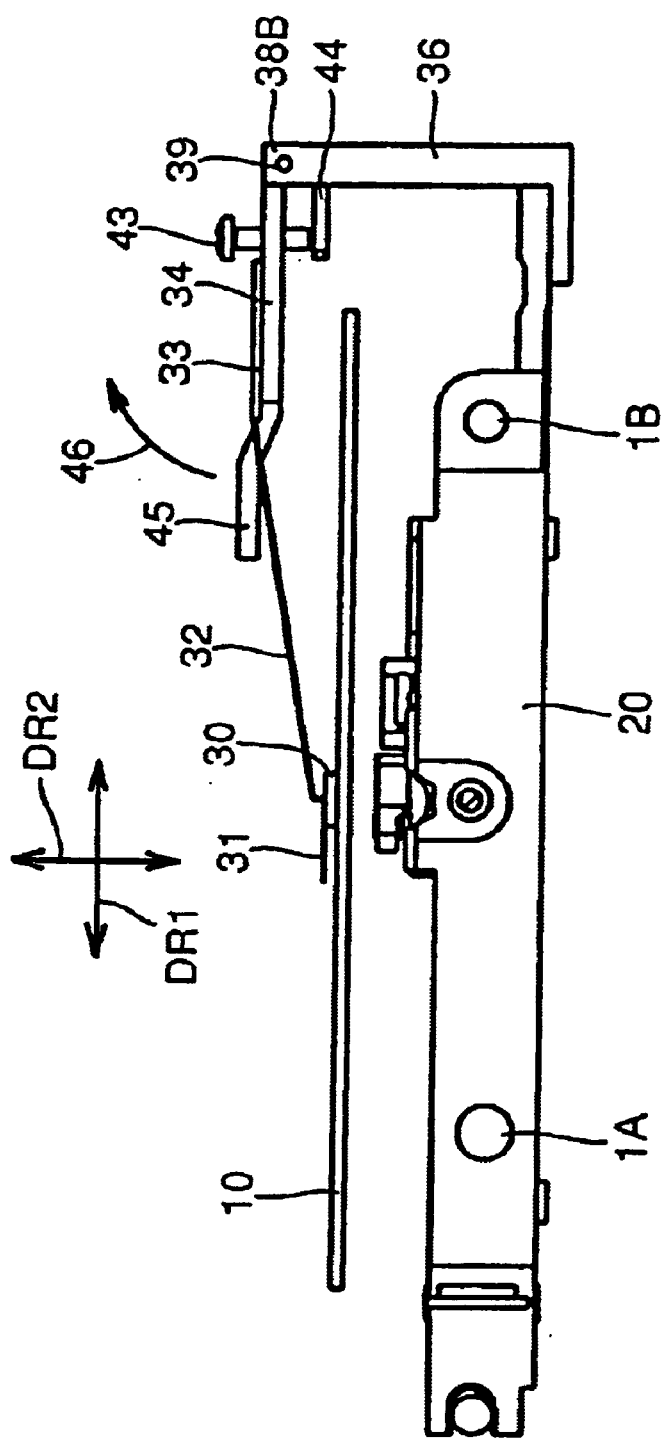
FIG. 7 is a cross section viewed in a direction A in FIG. 6.

FIG. 7 is a cross section viewed in a direction A in FIG. 6. Spring 42 pushes support member 34 toward magneto-optical record medium 10 in a normal direction DR2 of magneto-optical record medium 10. Thereby, support member 33, arm 32 and slider 31 receive a force toward magneto-optical record medium 10, and magnetic head 30 is pushed against magneto-optical record medium 10. Since arm 32 is formed of the plate spring, magnetic head 30 is elastically pushed against magneto-optical record medium 10.

A screw 43 extends through support member 34, and has an end in contact with a member 44, which is fixed to support member 36. By turning screw 43 clockwise, screw 43 moves toward member 44 to increase the distance between support members 34 and member 44. This reduces a pushing force, by which magnetic head 30 is pushed against magneto-optical record medium 10. By turning screw 43 counterclockwise, screw 43 moves away from member 44 to reduce the distance between support member 34 and member 44. This increases the pushing force, by which magnetic head 30 is pushed against magneto-optical record medium 10. Thus, screw 43 controls the pushing force for pushing the magnetic head 30 against magneto-optical record medium 10.

By moving a lever 45 in a direction of an arrow 46, magnetic head 30 is spaced from magneto-optical record medium 10. Loading and unloading of magneto-optical record medium 10 are performed in this spaced state.

In this invention, screw 43, member 44, spring 42, support members 34 and 33, and arm 32 form a lowering mechanism for lowing magnetic head 30 to a position in contact with magneto-optical record medium 10.

Since magnetic head 30 is connected to optical head 20 via slider 31, arm 32, support members 33 and 34, and support member 36, magnetic head 30 moves in radial direction DR1 of magneto-optical record medium 10 in accordance with movement of optical head 20 in radial direction DR1 of magneto-optical record medium 10. Accordingly, once the optical axis of laser beams emitted from optical head 20 was positioned concentrically with the magnetic field applied from magnetic head 30, the optical axis of laser beam emitted from optical head 20 matches with the center of magnetic field even when optical head 20 moves in the radial direction of magneto-optical record medium 10 in the seek operation.

As shown in FIG. 7, magnetic head 30 is in contact with magneto-optical record medium 10 before turning magneto-optical record medium 10. In this state, magneto-optical record medium 10 turns in a direction of an arrow 48A (see FIG. 6) at a predetermined rotation speed, whereby air flows into a space between magnetic head 30 and magneto-optical record medium 10, and magnetic head 30 floats from magneto-optical record medium 10. In this case, a distance of about 5 $\mu$m is formed between magnetic head 30 and magneto-optical record medium 10.

Accordingly, when recording the signal on magneto-optical record medium 10, magnetic head 30 is floated by turning magneto-optical record medium 10 at a predetermined rotation speed, and the magnetic field modulated with the record signal is applied to magneto-optical record medium 10. When reproducing the signal from magneto-optical record medium 10, optical head 20 emits the laser beam to magneto-optical record medium 10 while floating magnetic head 30 by rotating magneto-optical record medium 10 at a predetermined speed. Thus, lever 45 is not used to space magnetic head 30 from magneto-optical record medium 10 when reproducing the signal from magneto-optical record medium 10.

Figure 8:
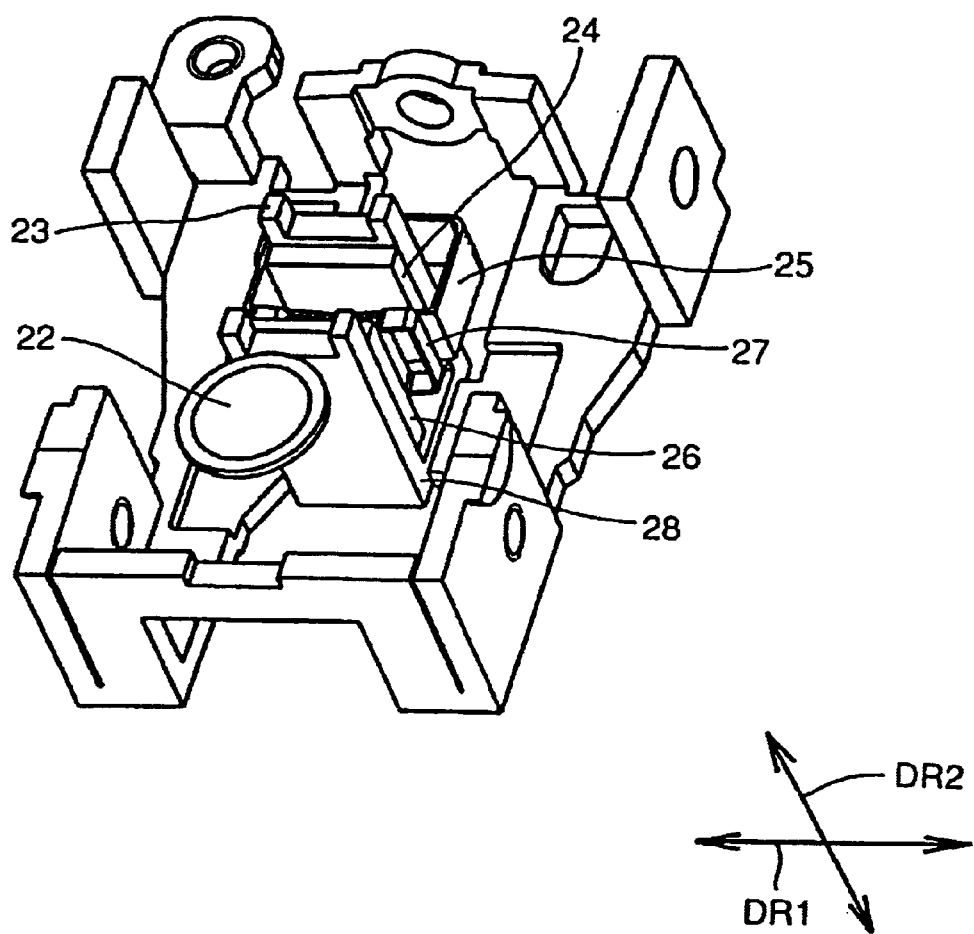
FIG. 8 is a perspective view of the objective lens included in an optical head of the magneto-optical disk apparatus shown in FIG. 6 as well as an architecture performing focus servo-control and tracking servo-control of the objective lens.

Referring to FIG. 8, description will now be given on focus servo-control and tracking servo-control of objective lens 22. A magnet 24 is arranged on one of the surfaces of support member 23, and a coil 25 is arranged around support member 23 and magnet 24. A magnet 26 is arranged on one of the surfaces of support member 28, and a coil 27 is opposed to magnet 26. Although not shown, a coil having the same structure as coil 27 is arranged beside coil 27. Objective lens 22 is disposed on the surface of support member 28 opposite to the surface carrying magnet 26. By energizing coil 25, coil 25 receives a Lorentz force in normal direction DR2 (which may also be referred to as a "focus direction") of magneto-optical record medium 10 from magnet 24, and moves in focus direction DR2. Thereby, objective lens 22 can move in focus direction DR2. Coil 27 and the coil (not shown) are energized to receive a Lorentz force in radial direction DR1 (which may also be referred to as a "tracking direction") of magneto-optical record medium 10 from magnet 26 so that objective lens 22 can move in tracking direction DR1 of magneto-optical record medium 10.

Optical head 20 shown in FIGS. 6 and 7 includes magnets 24 and 26, and coils 25 and 27. Focus servo-control and tracking servo-control of objective lens 22 are performed by energizing coils 25 and 27. In the operation of reproducing the signal with laser beams while keeping magnetic head 30 in contact with magneto-optical record medium 10 as described above, a magnetic flux coming from magnets 24 and 26 is concentrated on the core (made of magnetic material such as ferrite) of magnetic head 30, and the magnetic flux thus concentrated on the core of magnetic head 30 affects the magnetic layer of magneto-optical record medium 10 opposed to magnetic head 30. As a result, in the operation of transferring the magnetic domain from the record layer forming the magnetic layer of magneto-optical record medium 10 to the reproduction layer through a non-magnetic layer, the transferred domain on the reproduction layer is affected by the magnetic flux concentrated on the core of magnetic head 30. As a result, the plane of polarization of laser beams is rotated by magnetization, which is different from the magnetization to be originally held by the magnetic domain transferred onto the reproduction layer, and it is difficult to detect the rotation of the plane of polarization of the laser beam to be caused originally.

Referring to FIG. 6 again, magnet 41 is attached to a lid member 40 FIG. 6 is a perspective view showing lid member 40 in the open state.

Figure 9:
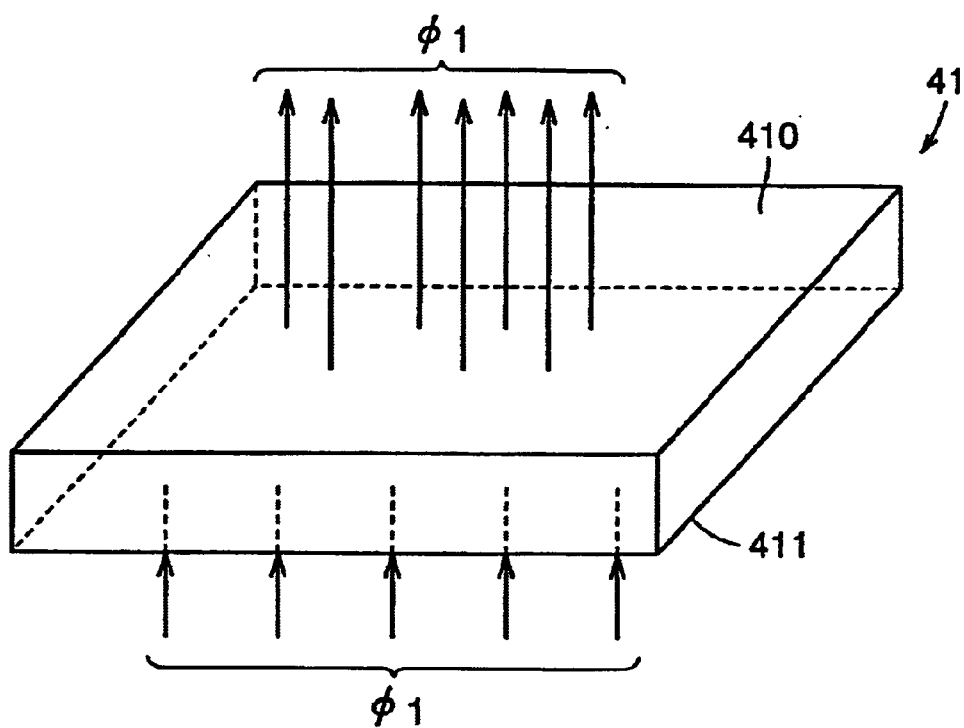
FIG. 9 is a perspective view showing a magnet of the magneto-optical disk apparatus shown in FIG. 6.

Referring to FIG. 9, magnet 41 has a plate form having a flat surface 410, from which a magnetic flux is emitted, and a flat plane 411 receiving an incoming magnetic flux. Thus, magnetic flux $\phi 1$ is emitted from flat surface 410, and enters flat surface 411.

Figure 10:
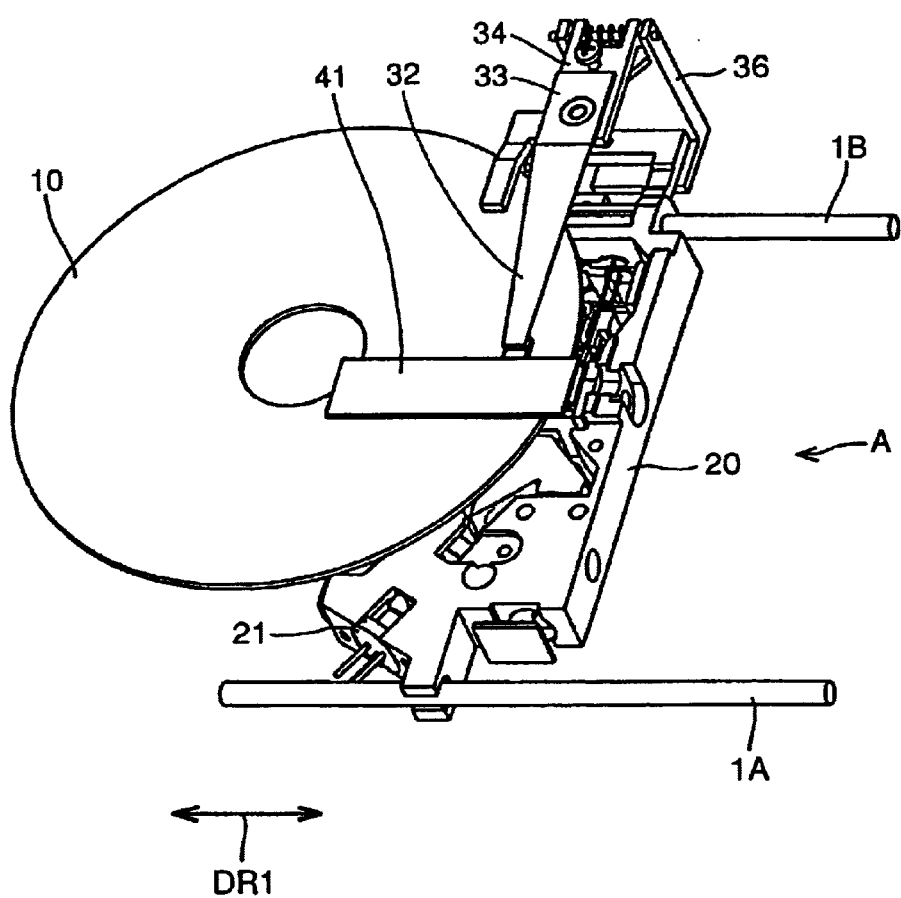
FIG. 10 is a perspective view showing a state where a cover member in FIG. 6 is closed.

FIG. 10 is a perspective view showing a state, in which lid member 40 shown in FIG. 6 is moved in a direction of an arrow 48B (see FIG. 6) to a closed position. Lid member 40 is not shown in FIG. 10 for clearly showing a position of magnet 41 with respect to optical head 20 and magnetic head 30. Magnet 41 is on the same side as magnetic head 30 with respect to magneto-optical record medium 10, and is arranged such that the longitudinal direction thereof is parallel to radial direction DR1 of magneto-optical record medium 10. Magnetic flux $\phi 1$ emitted from flat surface 410 of magnet 41 cancels the magnetic flux caused by magnets 24 and 26 included in optical head 20 so that the magnetic flux caused by magnets 24 and 26 may not exert a magnetic influence on the magnetic layer of magneto-optical record medium 10.

Figure 11:
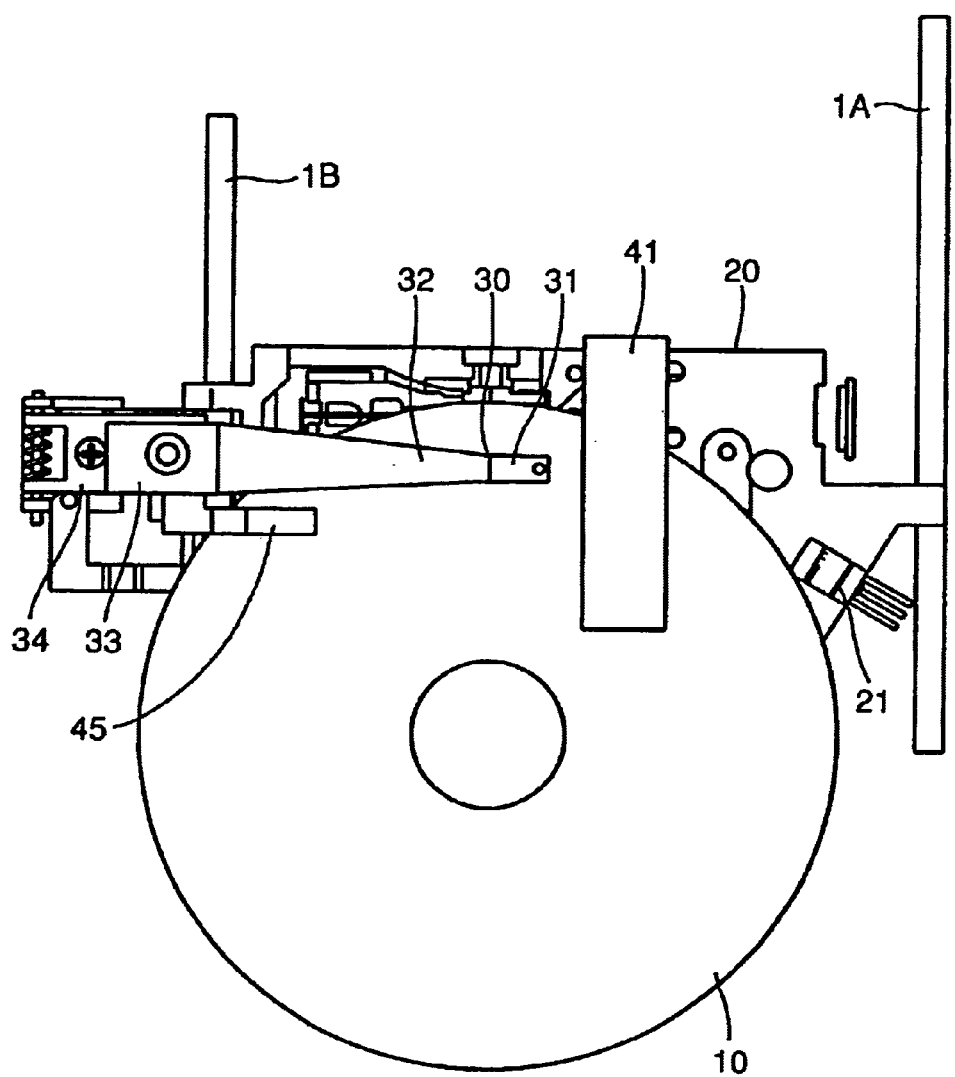
FIG. 11 is a plan viewed from a magnetic head side in FIG. 10.

FIG. 11 is a plan viewed from the same side as magnetic head 30 and magnet 41 in FIG. 10. Magnet 41 is not disposed immediately above magnetic head 30, but is disposed in a position shifted toward rail 1A from the position of magnetic head 30. The reason for this will be described later.

Figure 12:
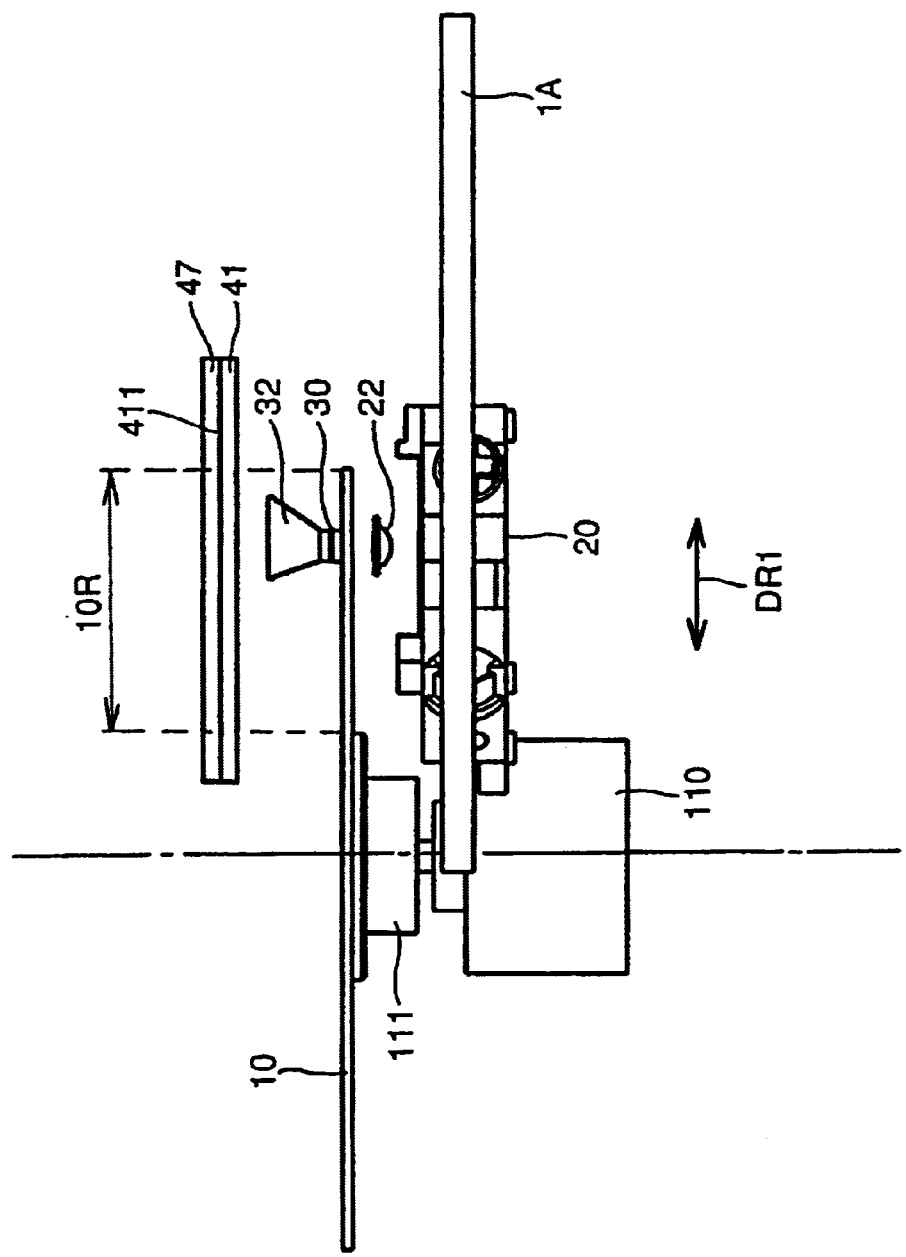
FIG. 12 is a cross section viewed from a semiconductor laser side in FIG. 10.

FIG. 12 is a cross section viewed from the same side as rail 1A in FIG. 10, magneto-optical record medium 10 is laid on a turn table 111. A spindle motor 110 rotates turn table 111 at a predetermined speed, and thereby rotates magneto-optical record medium 10 at the predetermined speed. Objective lens 22 is disposed at a position opposed to magnetic head 30 with magneto-optical record medium 10 therebetween. Magnet 41 has a longitudinal length longer than a record region 10R of magneto-optical record medium 10. This is for the purpose of cancelling a magnetic influence, which may be exerted by magnets 24 and 26 on the magnetic layer of magneto-optical record medium 10 when magnetic head 20 performs the seek along rails 1A and 1B, and thus in radial direction DR1 of magneto-optical record medium 10, and thereby magnets 24 and 26 included in optical head 20 as well as magnetic head 30 move in radial direction DR1 of magneto-optical record medium 10. Thereby, the signal can be reproduced while cancelling the magnetic influence exerted by magnets 24 and 26 on the magnetic layer of magneto-optical record medium 10 wherever magnets 24 and 26 as well as magnetic head 30 move in record region 10R of magneto-optical record medium 10.

Figure 13:
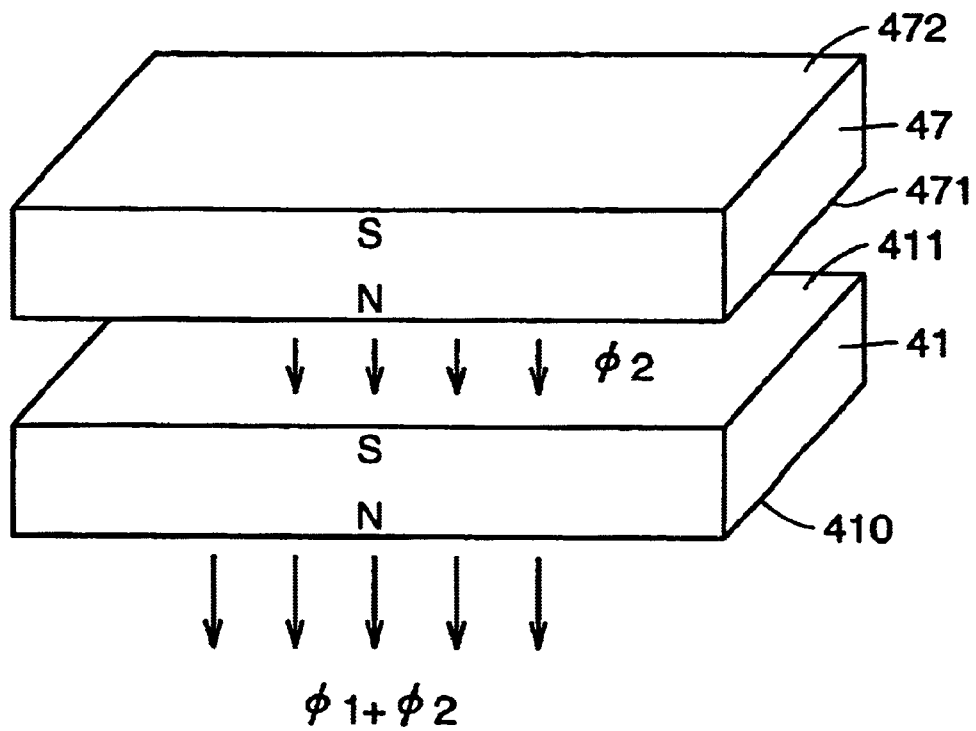
FIG. 13 is a perspective view showing a magnetic field leakage preventing material for preventing external leakage of a magnetic field.

A steel plate 47 is attached to flat surface 411 of magnet 41. Steel plate 47 is arranged on lid member 40. Thereby, steel plate 47 in contact with flat surface 411 of magnet 41 has magnetism. Assuming that flat surfaces 410 and 411 of magnet 41 provide N- and S-poles, respectively, as shown in FIG. 13, a flat surface 471 of steel plate 47, which is in contact with flat surface 411 of magnet 41, provides an N-pole, and flat surface 472 provides an S-pole. Assuming that flat surface 471 emits a magnetic flux $\phi 2$, a magnetic flux $\phi 2$ is added to magnetic flux $\phi 1$ emitted from plat surface 410 of magnet 41. As a result, magnet 41 emits magnetic fluxes $\phi 1+\phi 2$. Magnetic fluxes $\phi 1+\phi 2$ are used for cancelling the magnetic flux coming from magnets 24 and 26 included in optical head 20.

Steel plate 47 receives magnetic flux $\phi 2$ through flat surface 472. Therefore, if steel plate 47 is not interposed between magnet 41 and lid member 40, magnetic flux $\phi 1$ would pass through lid member 40 into magnet 41. Thereby, magneto-optical record medium 10 located near lid member 40 would be magnetically affected, and the recorded signal might be erased. Accordingly, magnet 41 is attached to lid member 40 with steel plate 47 therebetween for the purpose of reducing the magnetic flux passing through lid member 40 into magnet 41.

Steel plate 47 is made of a material which is selected to provide such a relationship that a flux density of magnetic flux $\phi 2$ is smaller than a flux density of magnetic flux $\phi 1$. Thereby, a magnetic influence, which may be externally exerted, can be smaller than that in the case where magnet 41 is directly attached to lid member 40. Because steel plate 47 emits magnetic flux $\phi 2$ from flat surface 471 toward magnetic head 30 as already described, the density of magnetic flux to be provided by magnet 41 can be smaller than that in the case where steel plate 47 is not employed.

More specifically, if steel plate 47 is not employed, magnet 41 must provide flux density from 5250 to 5650 gauss for cancelling the magnetic flux coming from magnets 24 and 26 included in optical head 20. By employing steel plate 47, the required flux density of magnet 41 is equal to about 2600 gauss, and thus can be cut in half. The leaked magnetic field caused by magnet 41, which is measured outside lid member 40, is equal to about 360 gauss if steel plate 47 is not employed. By employing steel plate 47, it decreases to about 50 gauss or less, and thus to 1/6–1/7.

As described above, magnet 41 is disposed on lid member 40 with steel plate 47 therebetween. Thereby, it is possible to reduce the flux density of magnet 41, which is required for cancelling the influence by the magnetic flux coming from magnets 24 and 26. It is also possible to reduce the externally leaked magnetic flux of magnet 41. Steel iron 47 is made of a tinplate of 0.2 mm in thickness.

Figure 14:
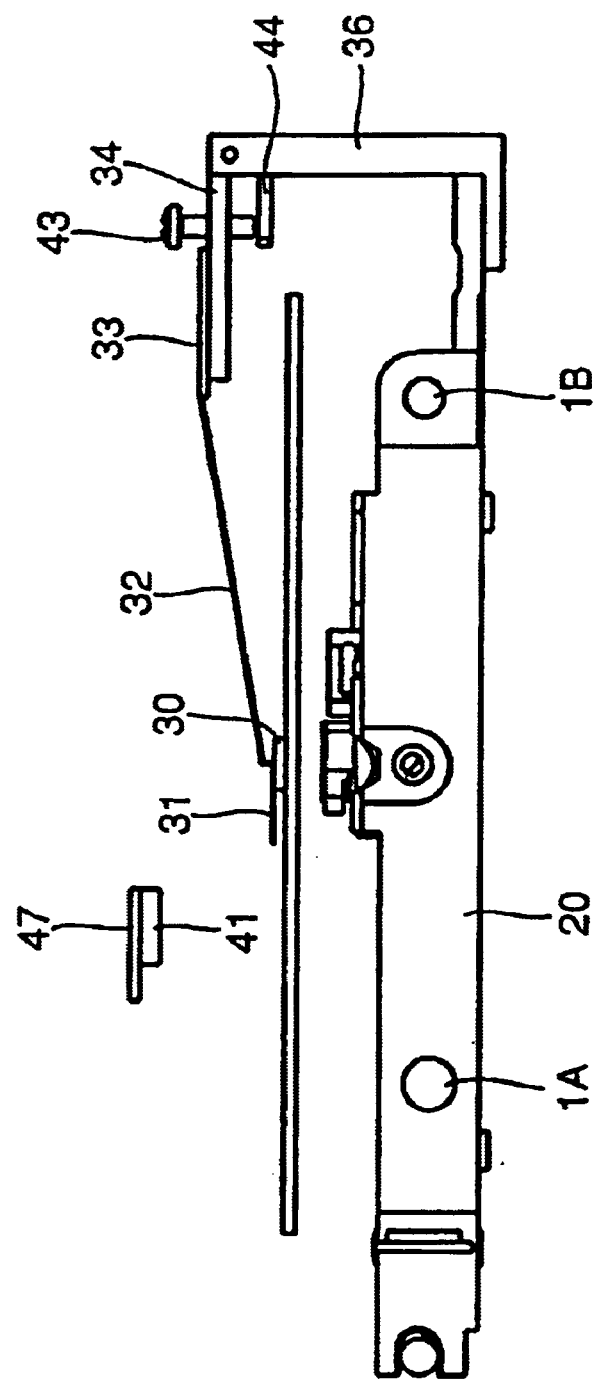
FIG. 14 is a cross section viewed in the direction A in FIGS. 6 and 10.
Figure 15:
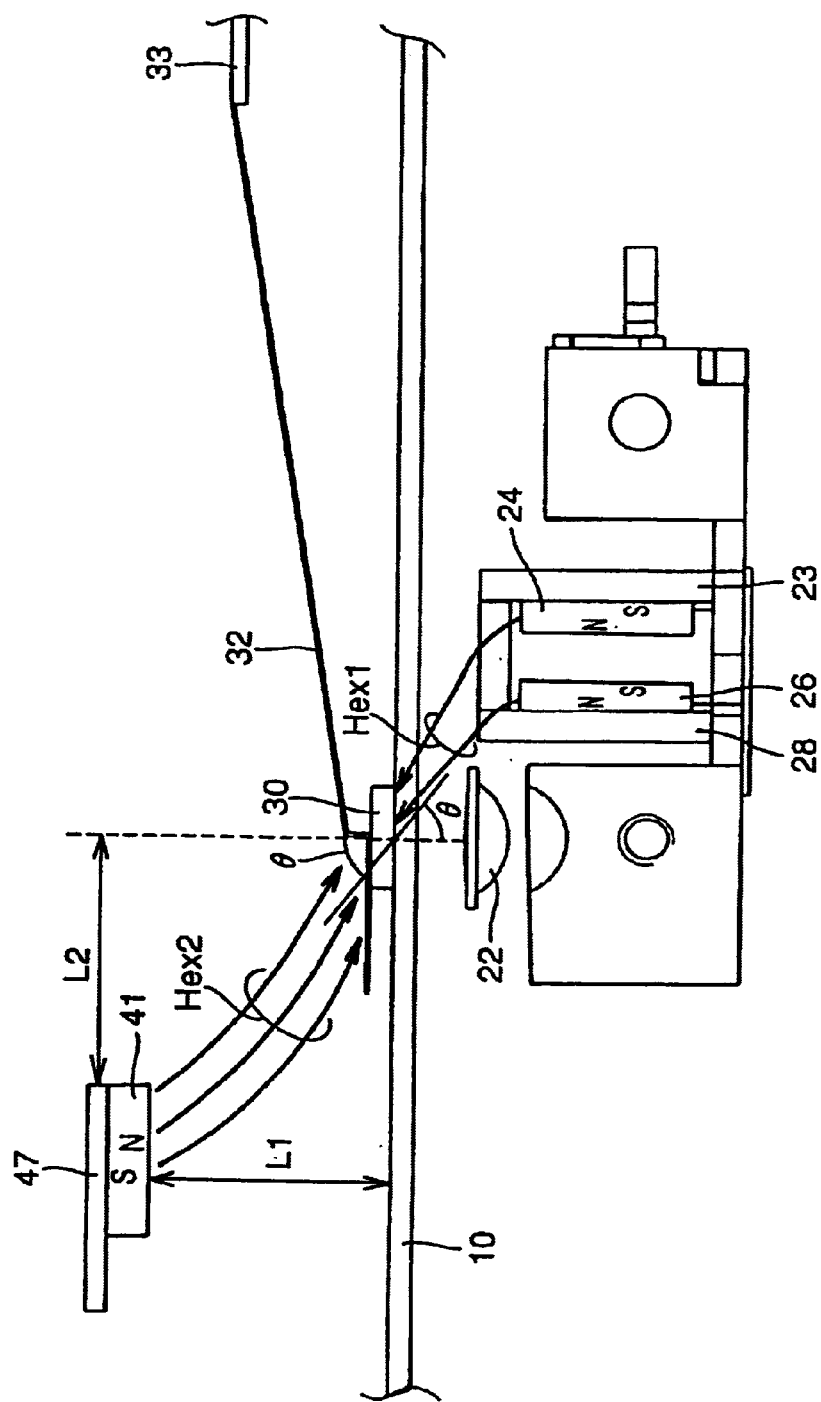
FIG. 15 is a cross section showing positions of magnets arranged in the magneto-optical disk apparatus shown in FIG. 6.

FIG. 14 is a cross section viewed in a direction A in FIGS. 6 and 10. Magnets 41 and 47 are arranged in positions shifted from magnetic head 30 toward rail 1A. The reason for this will now be described with reference to FIG. 15. A magnetic field Hex1 directed from magnets 24 and 26 toward magnetic head 30 is present between magnets 24 and 26 included in optical head 20 and magnetic head 30. Magnetic field Hex1 does not enter magnetic head 30 in the normal direction, but enters magnetic head 30 from magnets 24 and 26 at an angle θ with respect to the normal direction of magnetic head 30. Accordingly, for cancelling magnetic field Hex1 with a magnetic field Hex2 emitted from magnet 41, magnetic field Hex2 must enter magnetic head 30 at angle θ with respect to the normal direction of magnetic head 30. For the above reason, magnet 41 is not located immediately above magnetic head 30, but is located at the position shifted from magnetic head 30 toward rail 1A. Magnetic field Hex2 has the same magnitude as magnetic field Hex1, but the directions thereof are opposite to each other.

A distance L1 between magnet 41 and magneto-optical record medium 10 is 6.38 mm, and a distance L2 between magnet 41 and the center of magnetic head 30 is 6.7 mm. As a result, magnetic field Hex2 coming from magnet 41 enters magnetic head 30 at angle θ of 53.9 degrees.

Figure 16:
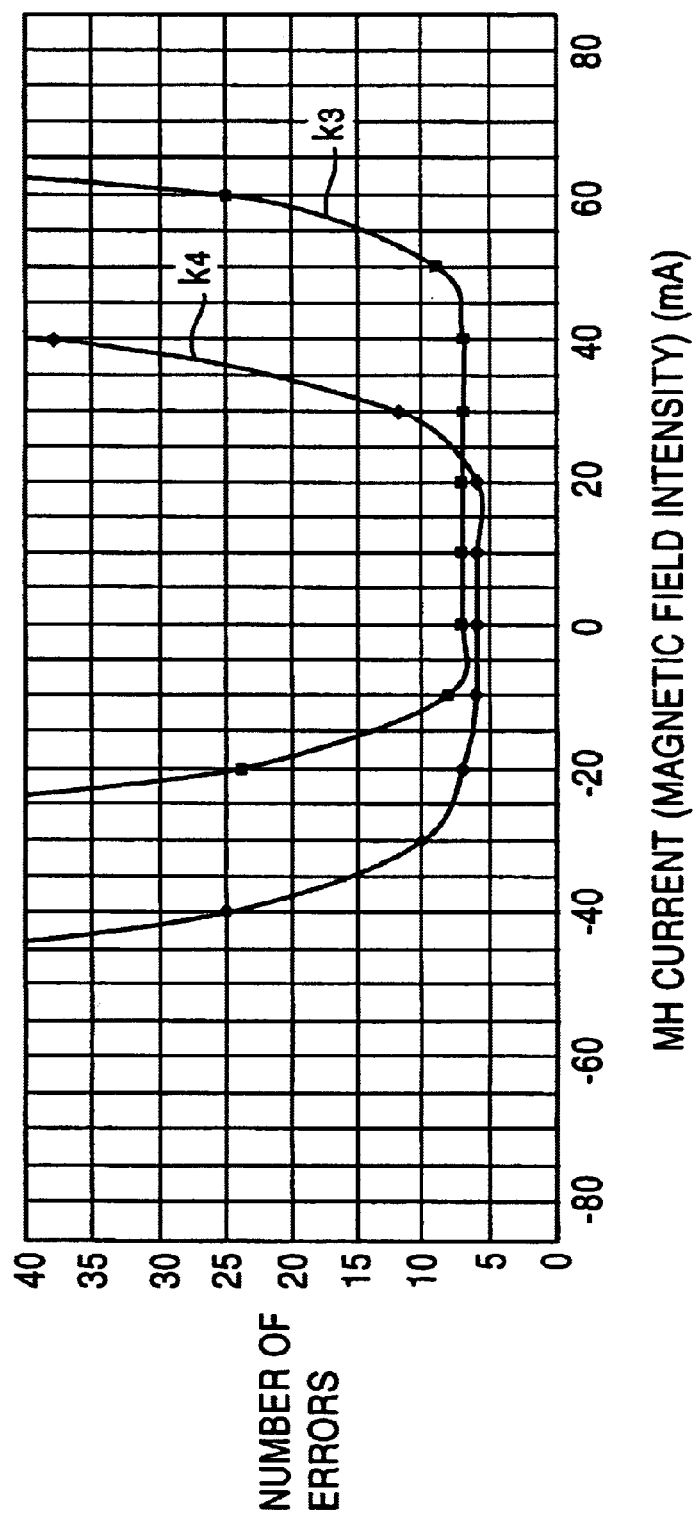
FIG. 16 shows an effect of the magnets in the magneto-optical disk apparatus shown in FIG. 6, and particularly shows a relationship between the number of errors and an MH current.

Referring to FIG. 16, an effect by magnet 41 will now be described. FIG. 16 shows a relationship between the number of errors and the DC magnetic field intensity, which is measured in the magnetic field intensity detecting method according to the invention. The abscissa gives an MH current corresponding to the intensity of the DC magnetic field. The ordinate gives the number of errors in reproduced signal, which are detected from the magneto-optical record medium 10.

A curve k3 represents the case where magnet 41 is not arranged, and a curve k4 represents a case where magnet 41 is arranged. It is assumed that, by flowing the MH current in the positive direction through coil 302, a DC magnetic field DC1 is applied to reproduction layer 101. It is also assumed that, by flowing the MH current in the negative direction through coil 302, a DC magnetic field DC2 is applied to reproduction layer 101.

First, description is given on the case where magnet 41 is not employed. A magnetic domain having magnetization 102 is transferred onto reproduction layer 101, and DC magnetic field DC1 having a changed intensity is applied to reproduction layer 101. When the MH current is in a range of 0 to 40 mA, the number of errors hardly changes. The number of errors starts to increase with the MH current of 50 mA, and rapidly increases when the MH current exceeds 50 mA. Also, a domain having magnetization 103 is transferred onto reproduction layer 101, and DC magnetic field DC2 having a changed intensity is applied to reproduction layer 101. In this case, the number of errors hardly changes when the MH current is in a ranged from −10 to 0 mA. When the MH current lowers to or below −10 mA, and thus increases in absolute value to or above 10 mA, the number of errors rapidly increases. The number of errors rapidly increases in accordance with certain increase in intensities of DC magnetic fields DC1 and DC2 because DC magnetic fields DC1 and DC2 invert the magnetic domain transferred onto reproduction layer 101 to the direction of magnetization.

As a result, in the structure not provided with magnet 41, the number of errors and the MH current exhibit the relationship represent by curve k3, and the MH current exhibit a curve, which is symmetrical with respect to a value of +20 mA. In principle, if no magnetic field other than DC magnetic fields DC1 and DC2 is applied to the region on reproduction layer 101 bearing the transferred domain, the MH current should exhibit a curve symmetrical with respect to 0 mA. However, the value of center, which was actually measured, is shifted negatively by 20 mA. In view of this fact, it is considered that a magnetic field in the same direction as magnetization 102 was applied to the region on reproduction layer 101 bearing the transferred domain. Thus, it can be determined that the magnetic field produced by magnets 24 and 26 included in optical head 20 was applied to the region on reproduction layer 101 bearing the transferred magnetic domains.

However, in the case where magnet 41 is employed, the MH current exhibits curve k4, which is symmetrical with respect to 0 mA. Thus, the magnetic domain having magnetization 102 is transferred onto reproduction layer 101, and DC magnetic field DC1 having the changed intensity is applied to reproduction layer 101. Thereby, the number of errors hardly changes when the MH current is in a range from 0 to 20 mA. The number of errors rapidly increases when the MH current exceeds 20 mA. The magnetic domain having magnetization 103 is transferred onto reproduction layer 101, and DC magnetic field DC2 having the changed intensity is applied to reproduction layer 101. Thereby, the number of errors hardly changes when the MH current is in a range from −20 to 0 mA. The number of errors rapidly increases when the MH current is lower than −20 mA, and thus is larger in absolute value than 20 mA. The number of errors increases with increase in intensities of DC magnetic fields DC1 and DC2 for the reason already described.

As a result, the curve k4 is obtained, which is symmetrical with respect to the MH current of 0 mA. Accordingly, provision of magnet 41 can remove the influence exerted by the magnetic fields of magnets 24 and 26 included in optical head 20.

In the above description, the magnet, which produces magnetic field Hex2 for cancelling magnetic field Hex1 applied from magnets 24 and 26 included in optical head 20 toward magnetic head 30, is disposed on the same side as magnetic head 30 with respect to magneto-optical record medium 10. However, the invention is not restricted to this, and the magnet for producing magnetic field Hex2 cancelling magnetic field Hex1 may be disposed on the same side as optical head 20 with respect to magneto-optical record medium 10.

Figure 17:
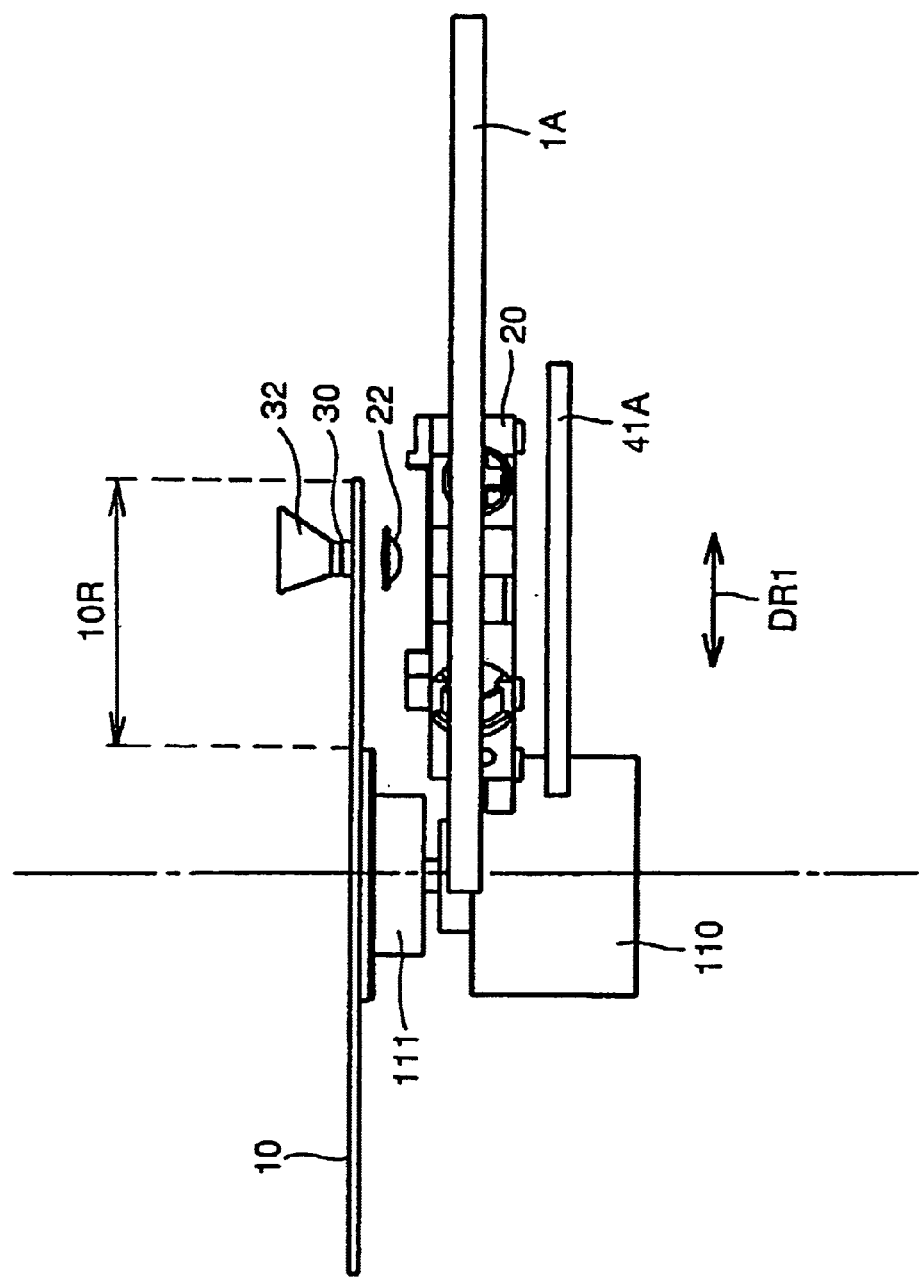
FIG. 17 is a cross section showing another example of the position of the magnet in the magneto-optical disk apparatus shown in FIG. 6.

FIG. 17 is a cross section of a structure, in which the magnet for producing magnetic field Hex2 cancelling magnetic field Hex1 is disposed on the same side as optical head 20 with respect to magneto-optical record medium 10, and corresponds to FIG. 7. A magnet 41A is disposed under optical head 20. Magnet 41A has a longitudinal length greater than record region 10R in magneto-optical record medium 10. Magnet 41A is disposed such that the longitudinal direction thereof is parallel to radial direction DR1 of magneto-optical record medium 10. Thereby, even when magnets 24 and 26 included in optical head 20 and magnetic head 30 move in radial direction DR1 of magneto-optical record medium 10 for the seek operation of optical head 20, magnet 41A can cancel magnetic field Hex1 applied from magnets 24 and 26 to magnetic head 30.

Figure 18:
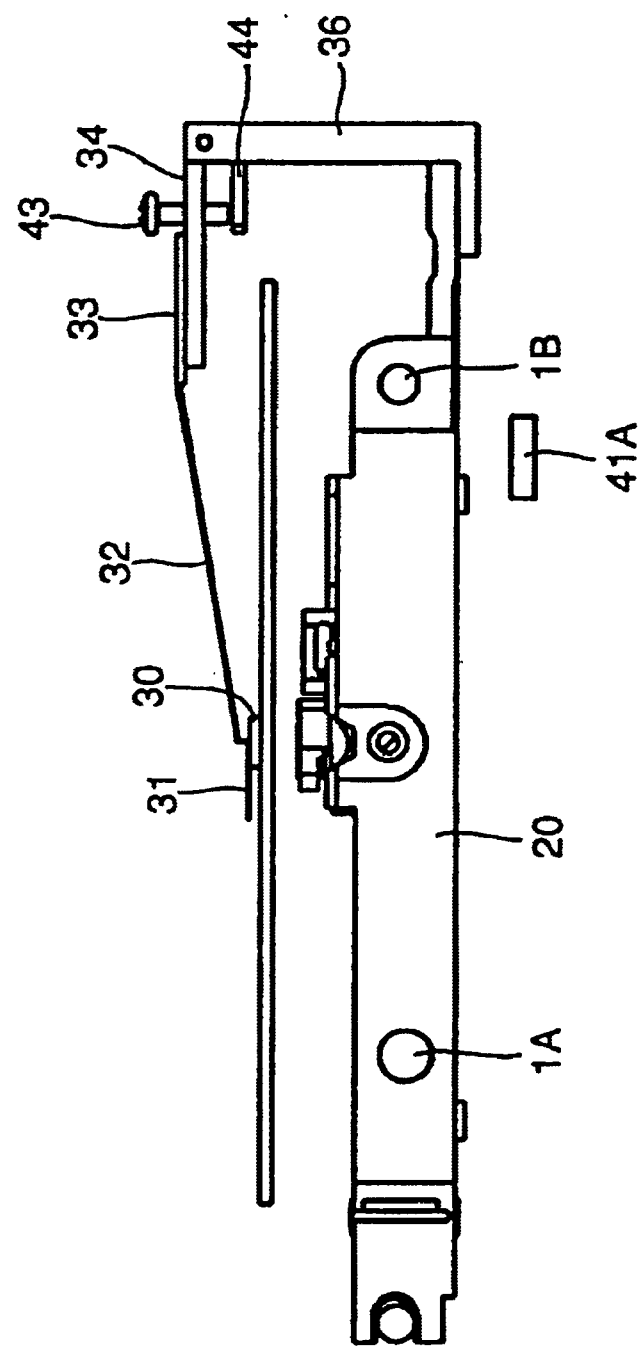
FIG. 18 is a cross section showing still another example of the position of the magnet in the magneto-optical disk apparatus shown in FIG. 6.

Referring to FIG. 18, magnet 41A is disposed under optical head 20. Even in this case, magnet 41A is not disposed immediately under magnetic head 30, but is disposed in the position shifted toward rail 1B from magnetic head 30. In FIG. 18, radial direction DR1 of magneto-optical record medium 10 is perpendicular to the sheet of the drawing.

Figure 19:
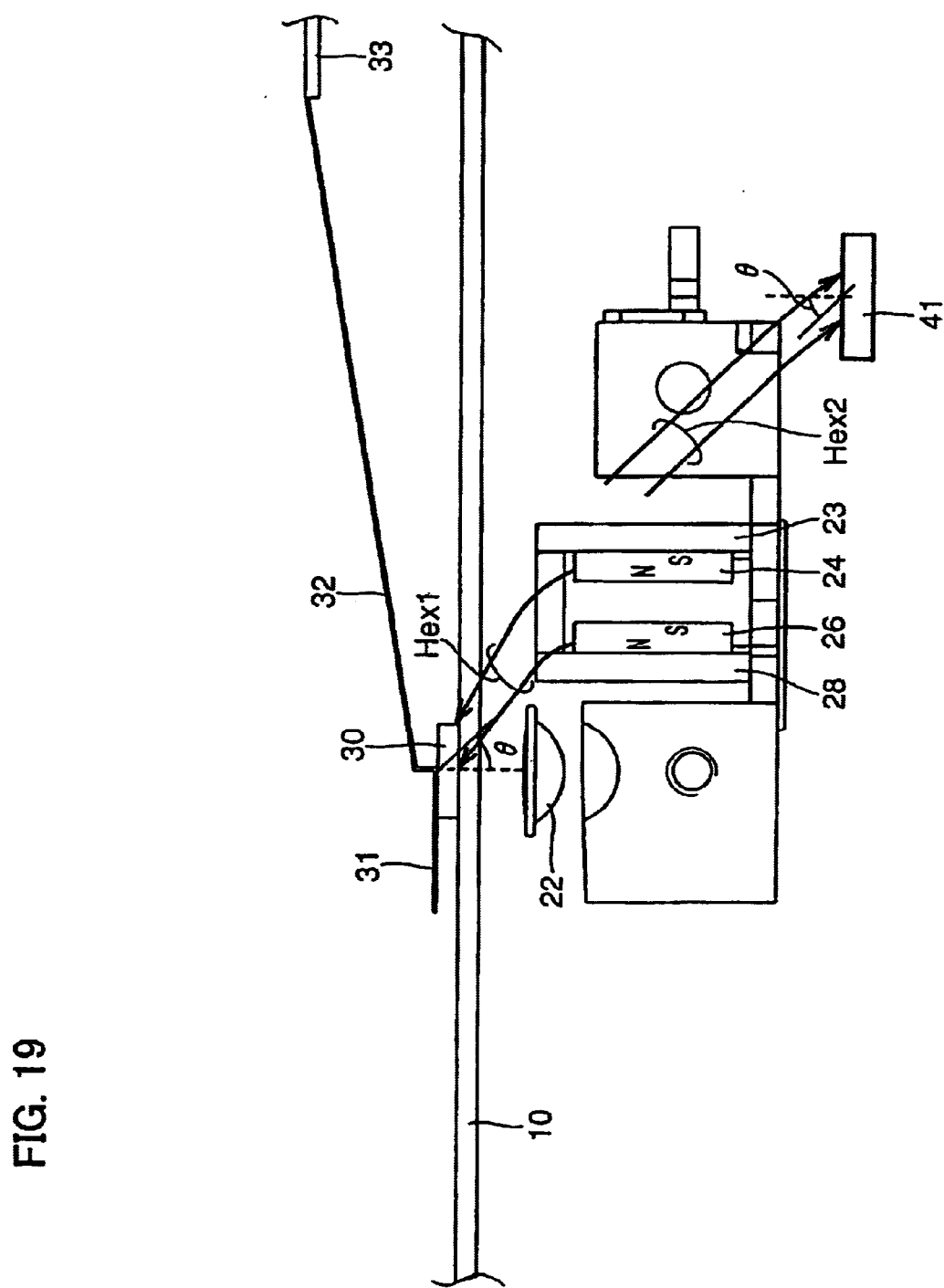
FIG. 19 is a cross section showing yet another example of the position of the magnet in the magneto-optical disk apparatus shown in FIG. 6.

Referring to FIG. 19, description will now be given on such disposition that magnet 41A is shifted toward rail 1B with respect to magnetic head 30. As already described, magnetic field Hex1 directed from magnets 24 and 26 included in optical head 20 toward magnetic head 30 is present between magnets 24 and 26 and magnetic head 30. Magnetic field Hex1 applied form magnets 24 and 26 enters magnetic head 30 at angle θ with respect to the normal direction of magnetic head 30. For cancelling magnetic field Hex1 with magnetic field Hex2 emitted from magnet 41A, therefore, magnetic field Hex2 directed from magnetic head 30 toward magnet 41A must enter magnet 41A at angle θ with respect to the normal direction of magnet 41A. For this reason, magnet 41A is not disposed immediately under magnetic head 30, but is shifted toward rail 1B from the position of magnetic head 30.

Figure 20:
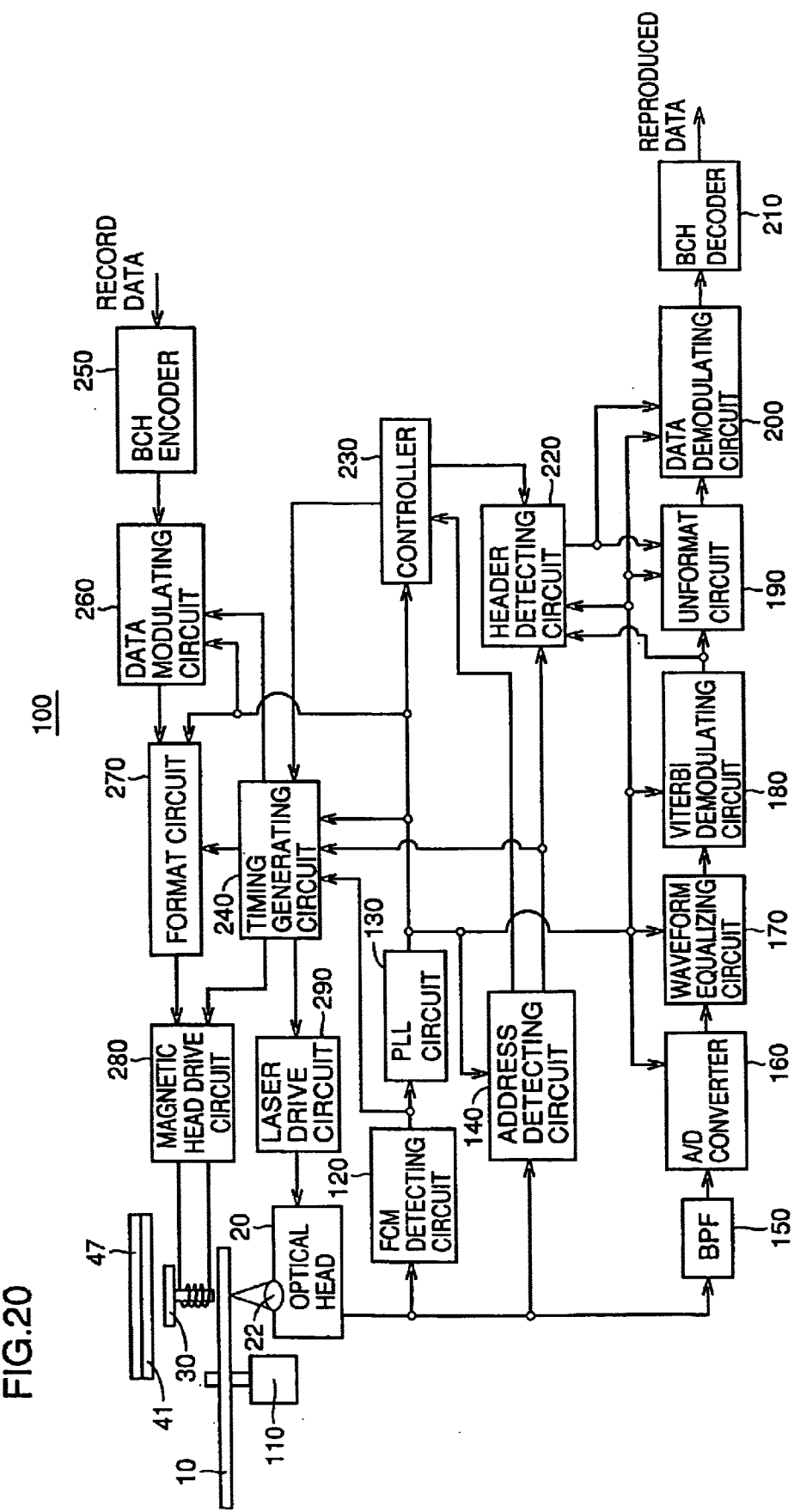
FIG. 20 is a schematic block diagram of a magneto-optical disk apparatus of a first embodiment.

Referring to FIG. 20, magneto-optical disk apparatus 100 includes spindle motor 110, optical head 20, magnetic head 30, magnet 41, a fine clock mark detecting circuit (FCM detecting circuit) 120, a PLL circuit 130, an address detecting circuit 140, a BPF 150, an A/D converter 160, a waveform equalizing circuit 170, a Viterbi demodulating circuit 180, an unformat circuit 190, a data demodulating circuit 200, a BCH decoder 210, a header detecting circuit 220, a controller 230, a timing generating circuit 240, a BCH encoder 250, a data modulating circuit 260, a format circuit 270, a magnetic head drive circuit 280 and a laser drive circuit 290.

Magnet 41 prevents the concentration of the magnetic field, which is emitted from magnets 24 and 26 included in optical head 20, on magnetic head 30. Spindle motor 110 rotates magneto-optical record medium 10 at a predetermined rotation speed. Optical head 20 emits the laser beams onto magneto-optical record medium 10, and detects the reflected beams. FCM detecting circuit 120 detects a fine clock mark detection signal indicating the position of fine clock mark 3 on magneto-optical record medium 10, and outputs the fine clock mark detection signal thus detected to PLL circuit 130 and timing generating circuit 240.

PLL circuit 130 produces a clock based on the fine clock mark detection signal sent from FCM detecting circuit 120, and sends the clock thus produced to address detecting circuit 140, A/D converter circuit 160, waveform equalizing circuit 170, Viterbi demodulating circuit 180, unformat circuit 190, data demodulating circuit 200, controller 230, timing generating circuit 240, data modulating circuit 260 and format circuit 270.

Address detecting circuit 140 receives an address signal, which is detected by optical head 20 from segment S0 on magneto-optical record medium 10 in a tangential push-pull method, detects the address information in synchronization with the clock supplied from PLL circuit 130 and produces the address detection signal, which indicates the fact that the address information is detected, at the final position of the address signal. Address detecting circuit 140 sends the address information thus detected to controller 230, and sends the address detection signal thus produced to header detecting circuit 230 and timing generating circuit 240.

BPF 150 cuts off high and low ranges of the reproduced signal reproduced from magneto-optical record medium 10. A/D converter 160 converts the reproduced signal from an analog signal to a digital signal in synchronization with the clock sent from PLL circuit 130.

Waveform equalizing circuit 170 effects PR (1, 1) waveform equalization and others on the reproduced signal, which is converted into the digital signal in synchronization with the clock sent from PLL circuit 130. This equalization is performed to cause one-to-one waveform interference between the data before and after the detection signal.

Viterbi demodulating circuit 180 converts the reproduced signal in the multilevel form into the binary form in synchronization with the clock sent from PLL circuit 130, and outputs the reproduced signal thus converted to unformat circuit 190 and header detecting circuit 220.

Unformat circuit 190 removes pre-write (Pre-Write), post-write (Post-Write) and header (header), which are recorded in a user data region on magneto-optical record medium 10, based on the timing signal supplied from header detecting circuit 220.

Data demodulating circuit 200 receives the reproduced signal, which is unformatted, in synchronization with the clock sent from PLL circuit 130, and performs the demodulation for the digital modulation effected at the time of recording.

BCH decoder 210 performs the error correction on the reproduced signal thus demodulated to output the signal as reproduced data. Header detecting circuit 220 detects the position of the header included in the reproduced signal based on the address information sent from controller 230 and the address detection signal sent from address detecting circuit 140, and produces the timing signals for the pre-write (Pre-Write) and header (Header) from the reproduced signal in synchronization with the clock sent from PLL circuit 130. The timing signal thus produced for the header (Header) is output to unformat circuit 190 and data demodulation circuit 200.

Controller 230 receives the address information detected by address detecting circuit 140, and controls the servomechanism (not shown) based on the address information to access the intended position by optical head 20. Controller 230 outputs the address information to header detecting circuit 220 in synchronization with the clock sent from PLL circuit 130, and controls timing generating circuit 240.

Timing generating circuit 240 controlled by controller 230 produces timing signal in synchronization with the clock supplied from PLL circuit 130 based on the fine clock mark detection signal supplied from FCM detecting circuit 120 and the address end position supplied from address detecting circuit 140, and outputs the timing signal thus produced to format circuit 270, magnetic head drive circuit 280 and laser drive circuit 290.

BCH encoder 250 adds an error correction code to the record data. Data modulating circuit 260 modulates the record data into a predetermined format. Format circuit 270 operates in synchronization with the clock sent from PLL circuit 130 and based on the timing signal sent from timing generating circuit 240 to add pre-write (Pre-Write), header (Header) and post-write (Post-Write) to the record data for formatting the record data to match with the user data region. Format circuit 270 outputs the data thus formatted to magnetic head drive circuit 280.

Magnetic head drive circuit 280 drives magnetic head 30 in synchronization with the timing of timing signal sent from timing generating circuit 240 and based on the output of format circuit 270.

Laser drive circuit 290 drives semiconductor laser 21 included in optical head 20 based on the timing signal sent from timing generating circuit 240.

Magnetic head 30 is driven by magnetic head drive circuit 280, and adds the magnetic field, which is subjected to magnetic-field modulation with the record pattern or data pattern, to magneto-optical record medium 10.

Description will now be given on the operation of recording data on magneto-optical record medium 10 by magneto-optical disk apparatus 100. When magneto-optical record medium 10 is loaded on magneto-optical disk apparatus 100, controller 230 controls the servo-mechanism (not shown) to drive spindle motor 110 at a predetermined rotation speed, and also controls laser drive circuit 290 via timing generating circuit 240 to emit the laser beams with a predetermined intensity from optical head 20.

Thereby, servo-mechanism (not shown) drives spindle motor 110 at the predetermined rotation speed, and spindle motor 110 turns magneto-optical record medium 10 at the predetermined speed. Before magneto-optical record medium 10 turns at the predetermined rotation speed, magnetic head 30 is in contact with magneto-optical record medium 10. In accordance with rotation of magneto-optical record medium 10 at the predetermined speed, magnetic head 30 floats. Optical head 20 emits the laser beams of a predetermined intensity, which are converged by objective lens 22 onto magneto-optical record medium 10, and detects the beams reflected thereby. Optical head 20 outputs the focus error signal and tracking error signal to the servo-mechanism (not shown), which turns on the focus servo-control and tracking servo-control of objective lens 22 of optical head 20 based on the focus error signal and tracking error signal, respectively.

Thereafter, optical head 20 detects the optical signal in the radial push-pull method from magneto-optical record medium 10, and outputs the detected optical signal to FCM detecting circuit 120. FCM detecting circuit 120 detects the fine clock mark detection signal from the received optical signal, and outputs the detected fine clock mark detection signal to PLL circuit 130 and timing generating circuit 240. PLL circuit 130 produces the clock based on the fine clock mark detection signal, and outputs the clock thus produced to address detecting circuit 140, A/D converter 160, waveform equalizing circuit 170, Viterbi demodulating circuit 180, unformat circuit 190, data demodulating circuit 200, controller 230, timing generating circuit 240, data modulating circuit 260 and format circuit 270.

Address detecting circuit 140 receives the address signal, which is detected from segment S0 of magneto-optical record medium 10 by optical head 20 in the tangential push-pull method, and detects the address signal in synchronization with the clock supplied from PLL circuit 130. Also, address detecting circuit 140 produces the address detection signal, which indicates the fact that the address information is detected, at the end position of address information. The detected address information is output to controller 230, and the produced address detection signal is output to header detecting circuit 220 and timing generating circuit 240.

BCH encoder 250 adds an error correction code to the record data. Data modulating circuit 260 modulates the record data, which is sent from BCH encoder 250, into a predetermined format in synchronization with the clock sent from PLL circuit 130. Data modulation circuit 260 outputs the modulated record data to format circuit 270.

Controller 230 controls timing generating circuit 240 to generate the timing signal for generating the record signal suitable to the format of the data region when the address signal sent from address detecting circuit 140 designates the address of data region on magneto-optical record medium 10. Timing generating circuit 240 generates the timing signal synchronized with the clock based on the fine clock mark detection signal and address signal supplied thereto, and outputs the generated timing signal to format circuit 270, magnetic head drive circuit 280 and laser drive circuit 290.

Format circuit 270 formats the record signal sent from data modulating circuit 260 based on the timing signal to match with the format of the data region, and outputs the formatted record signal to magnetic head drive circuit 280. Magnetic head drive circuit 280 drives magnetic head 30 to produce the magnetic field, which is modulated with the record signal, in synchronization with the timing signal. Laser drive circuit 290 drives semiconductor laser 21 included in optical head 20 in synchronization with the timing signal, and optical head 20 irradiates magneto-optical record medium 10 with the laser beams converged by objective lens 22. Magnetic head 30 applies the magnetic field, which is modulated with the record signal, to magneto-optical record medium 10. Thereby, the record data is recorded on magneto-optical record medium 10.

Then, description will now be given on the operation of reproducing the signal from magneto-optical record medium 10 by magneto-optical disk apparatus 100. After magneto-optical record medium 10 is loaded on magneto-optical disk apparatus 10, magnetic head 30 floats, and the focus servo-control and tracking servo-control of objective lens 22 are performed. These operations are performed in the same manner as those for the signal recording.

Thereafter, optical head 20 detects the optical signal from magneto-optical record medium 10 in the radial push-pull method, and outputs the detected optical signal to FCM detecting circuit 120. FCM detecting circuit 120 detects the fine clock mark detection signal from the optical signal supplied thereto, and outputs the fine clock mark detection signal thus detected to PLL circuit 130 and timing generating circuit 240. PLL circuit 130 produces the clock based on the fine clock mark detection signal, and outputs the clock thus produced to address detecting circuit 140, A/D converter 160, waveform equalizing circuit 170, Viterbi demodulating circuit 180, unformat circuit 190, data demodulating circuit 200, controller 230, timing generating circuit 240, data modulating circuit 260 and format circuit 270.

Address detecting circuit 140 receives the address signal, which is detected from segment S0 of magneto-optical record medium 10 by optical head 20 in the tangential push-pull method, and detects the address signal in synchronization with the clock supplied from PLL circuit 130. Also, address detecting circuit 140 produces the address detection signal, which indicates the fact that the address information is detected, at the end position of address information. The detected address signal is output to controller 230, and the produced address detection signal is output to header detecting circuit 220 and timing generating circuit 240.

Header detecting circuit 220 detects the position of the header included in the reproduced signal based on the address information sent from controller 230 and the address detection signal sent from address detecting circuit 140, and produces the timing signals for the pre-write (Pre-Write) and header (Header) from the reproduced signal in synchronization with the clock sent from PLL circuit 130. The timing signal thus produced for the header (Header) is output to unformat circuit 190 and data demodulation circuit 200.

Optical head 20 outputs the reproduced signal thus detected to BPF 150, which cuts off the high and low ranges of the reproduced signal. A/D converter 160 converts the reproduced analog signal, which is output from BPF 150, from the analog signal into the digital signal in synchronization with the clock sent from PLL circuit 130.

Waveform equalizing circuit 170 effects PR (1, 1) waveform equalization on the reproduced signal, which is converted into the digital signal, in synchronization with the clock sent from PLL circuit 130. This equalization is performed to cause one-to-one waveform interference between the data before and after the detection signal.

Thereafter, Viterbi demodulating circuit 180 converts the reproduced signal, which was subjected to the waveform equalization and is in the multilevel form, into the binary form in synchronization with the clock sent from PLL circuit 130, and outputs the reproduced signal thus converted to unformat circuit 190 and header detecting circuit 220.

Thereby, header detecting circuit 220 detects the position of the header included in the reproduced signal based on the address information sent from controller 230 and the address detection signal sent from address detecting circuit 140, and produces the timing signals for the pre-write (Pre-Write) and header (Header) from the reproduction signal in synchronization with the clock sent from PLL circuit 130. The produced timing signal for header (Header) is sent to unformat circuit 190 and data demodulating circuit 200.

Unformat circuit 190 removes the pre-write (Pre-Write), post-write (Post-Write) and header (header), which are recorded in the user data region on the magneto-optical record medium 10, based on the timing signal supplied from header detecting circuit 220.

Data demodulating circuit 200 receives the reproduced signal, which is unformatted, in synchronization with the clock sent from PLL circuit 130, and performs the demodulation for the digital modulation effected at the time of recording. BCH decoder 210 performs the error correction on the reproduced signal thus demodulated to output the signal as reproduced data. Thereby, the operation of reproducing the signal from magneto-optical record medium 10 is completed. When reproducing the signal, magnetic head 30 is kept in the floating state with respect to magneto-optical record medium 10. If magnet 41 were not employed, magnets 24 and 26 included in optical head 20 would magnetically affect the magnetic layer of magneto-optical record medium 10 to impede accurate reproduction of the signal. However, magnet 41 can cancel the magnetic influence by magnets 24 and 26 so that the signal can be reproduced accurately.

According to the first embodiment of the invention, the DC magnetic fields, which have changed intensities in the directions of the two DC magnetic fields, are applied to the reproduction layer of the magneto-optical record medium to detect the numbers of errors in the reproduced signal, and the relationship is determined between the numbers of errors thus detected and the intensities of the DC magnetic fields. Therefore, it is possible to measure the actual intensity of the influence magnetic field exerted from the magnets performing the servo-control of the objective lens. Further, the intensity of the influence magnetic field, which is exerted from the magnets for servo-control of the objective lens, is actually measured, and the signal is reproduced from the magneto-optical record medium while using the magnet for removing the influence by the influence magnetic field. Therefore, it is possible to prevent lowering of the characteristics of the reproduced signal, which may be caused by the magnets for servo-control of the objective lens.

Second Embodiment

In a second embodiment, the same manner as the detection manner in the first embodiment can be employed for detecting the intensity of the influence magnetic field exerted from the magnets for servo-control of objective lens 22.

Figure 21:
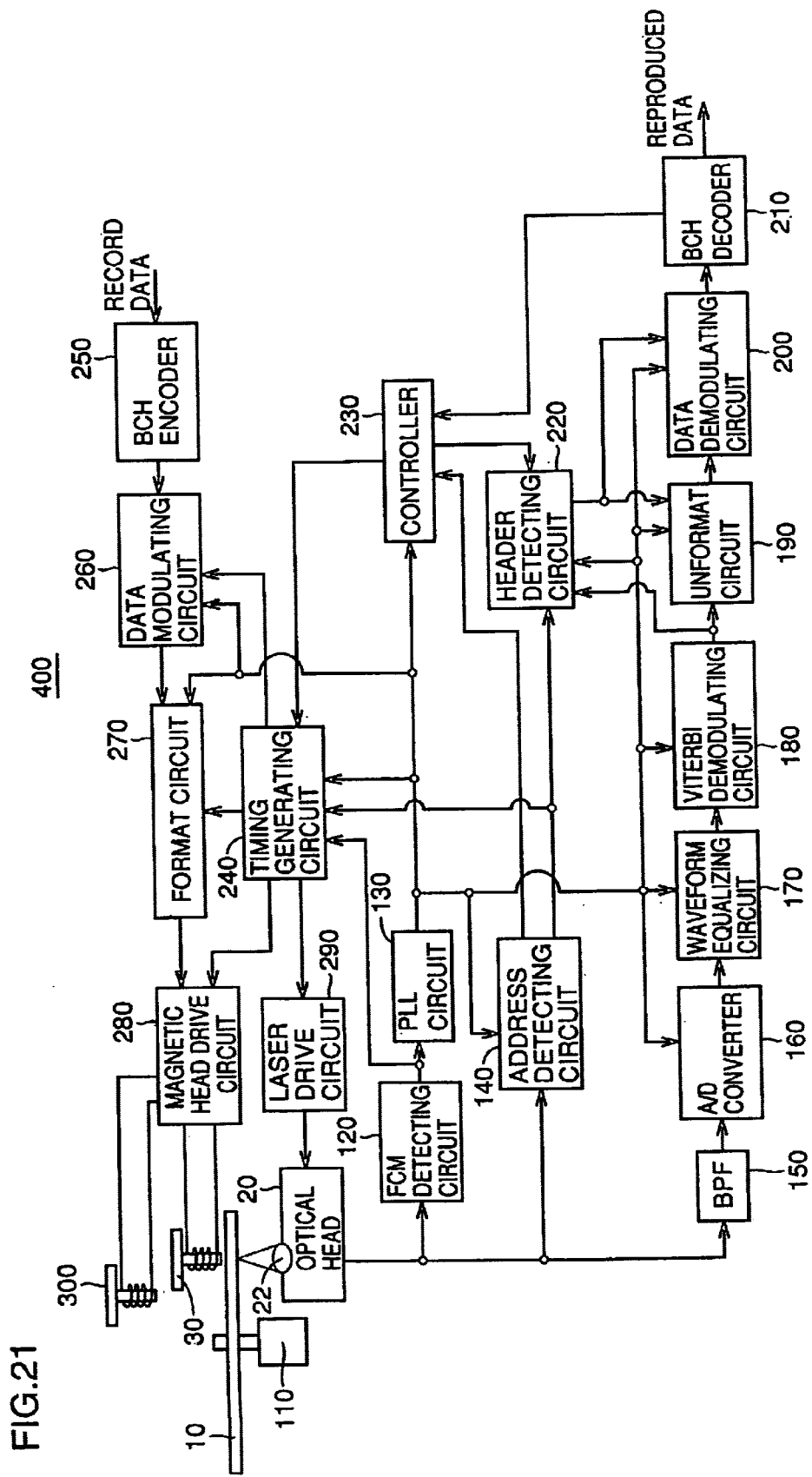
FIG. 21 is a schematic block diagram of a magneto-optical disk apparatus of a second embodiment.

Referring to FIG. 21, a magneto-optical disk apparatus 400 of the second embodiment includes the same structures as those of magneto-optical disk apparatus 100 shown in FIG. 20, and additionally includes a magnetic head 300. Further, BCH decoder 210 in the second embodiment is configured to output an error rate of the reproduced signal, i.e., the number of errors to controller 230. Structures other then the above are the same as those of magneto-optical disk apparatus 100.

Magnetic head 300 is driven by magnetic head drive circuit 280. Magneto-optical disk apparatus 400 actually measures the intensity of the influence magnetic field exerted from the magnets for servo-control of the objective lens, and can perform recording and/or reproducing of the signal while removing the influence by the magnetic field, of which intensity is actually measured. The intensity of the influence magnetic field exerted from the magnets for servo-control of the objective lens 22 is detected in the same detecting manner as the first embodiment.

Controller 230 controls the magnetic head drive circuit 280 through timing generating circuit 240 such that magnetic head 30 may apply the DC magnetic field having the changed intensity to magneto-optical record medium 10. Controller 230 also controls laser drive circuit 290 so that optical head 20 may emit the laser beams of a predetermined intensity to magneto-optical record medium 10. Magnetic head drive circuit 280 drives magnetic head 30 to emit the DC magnetic field, of which intensity is changed under control by controller 230, and magnetic head 30 applies the DC magnetic field having the changed intensity to magneto-optical record medium 10. Laser beam drive circuit 290 drives semiconductor laser 21 in optical head 20, and optical head 20 emits the laser beam of the predetermined intensity to magneto-optical record medium 10. The magneto-optical signals detected for the respective intensities of DC magnetic field are subjected to the reproducing processing by BPF 150, A/D converter 160, waveform equalizing circuit 170, Viterbi demodulating circuit 180, unformat circuit 190, data demodulating circuit 200 and BCH decoder 210, as already described in connection with the first embodiment. BCH decoder 210 outputs the error rate of reproduced signal, i.e., the number of errors to controller 230.

Thereby, controller 230 determines the intensity at the center of the symmetrical distribution of the magnetic field intensity based on the relationship between the intensity of the DC magnetic field and the number of errors in the reproduced signal, which is determined based on the number of errors supplied from BCH decoder 210. Thereby, controller 230 determines the intensity of the influence magnetic field. Based on the intensity of the influence magnetic field thus determined, controller 230 controls the magnetic head drive circuit 280 via timing generating circuit 240 to produce the magnetic field for cancelling the influence magnetic field. Magnetic head drive circuit 280 drives magnetic head 300 under control by controller 230, and magnetic head 300 produces the magnetic field for cancelling the influence magnetic field.

Magneto-optical disk apparatus 400 records and/or reproduces the signals on magneto-optical record medium 10 while removing the influence magnetic field, which may be exerted by the magnets for servo-control of objective lens 22, by magnetic head 300.

Magneto-optical disk apparatus 400 performs the operations of recording the signal on magneto-optical record medium 10 and reproducing the signal from magneto-optical record medium 10 in the same manners as those in the first embodiment.

According to the second embodiment, the magneto-optical disk apparatus actually measures the intensity of the influence magnetic field applied from the magnets for servo-control of the objective lends, and produces the magnetic field for removing the influence magnetic field based on the result of the actual measurement. Therefore, recording and/or reproducing of the signal on the magneto-optical record medium can be performed accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical disk apparatus for detecting an intensity of an influence magnetic field exerted on an irradiation point of a laser beam by a magnet for servo-control of an objective lens for irradiating a magneto-optical record medium with the laser beam, recording a signal on said magneto-optical record medium with the laser beam and the magnetic field, and/or reproducing the signal from said magneto-optical record medium with the laser beam, comprising:

a first magnetic head for applying the magnetic field to said magneto-optical record medium;

a lowering device for lowering said first magnetic head to a position in contact with said magneto-optical record medium;

an optical head including an objective lens arranged on the side remote from said first magnetic head with said magneto-optical record medium therebetween for converging the laser beam to said magneto-optical record medium, and said magnet;

a second magnetic head for cancelling said influence magnetic field;

a magnetic head drive circuit for driving said first or second magnetic head; and a control means for controlling said magnetic head drive circuit, wherein when detecting the intensity of said influence magnetic field, said control means controls said magnetic head drive circuit such that said first magnetic head applies a DC magnetic field in a first direction or a DC magnetic field in a second direction opposite to said first direction to said magneto-optical record medium while changing the intensity of the DC magnetic field, and determines the intensity of said influence magnetic field based on the number of errors in a reproduced signal detected by said optical head under said DC magnetic field, said magnetic head drive circuit drives said first magnetic head to apply said DC magnetic field to said magneto-optical record medium under control by said control means, said optical head detects the signal on said magneto-optical record medium; and when producing said signal, said control means controls said magnetic head drive circuit to produce by said second magnetic head the magnetic field of the same intensity as said determined intensity of the influence magnetic field, and said magnetic head drive circuit drives said second magnetic head to produce the magnetic field of the same intensity as said influence magnetic field under the control by said control means.

2. A method of detecting a magnetic field intensity for detecting an intensity of a magnetic field applied onto an irradiation point of a laser beam by a magnet for servo-control of an objective lens for irradiating a magneto-optical record medium with the laser beam, comprising:

a first step of emitting the laser beam to said magneto-optical record medium and simultaneously applying a DC magnetic field in a first direction to said irradiation point while changing the intensity of said DC magnetic field to reproduce the signal from said magneto-optical record medium;

a second step of detecting the number of errors in the reproduced signal reproduced in said first step;

a third step of applying a DC magnetic field in a second direction opposite to said first direction to said irradiation point to reproduce the signal from said magneto-optical record medium;

a fourth step of detecting the number of errors in the reproduced signal reproduced in said third step; and a fifth step of detecting an intensity of an influence magnetic field exerted on said irradiation point by said magnet based on the relationship between the numbers of errors detected in said second and fourth steps and the intensities of said DC magnetic fields.

3. The method of detecting the magnetic field intensity according to claim 2, wherein in the relationship between the detected number of said errors and the intensity of said DC magnetic field, the intensity of said first magnetic field starting increase in number of said errors during increase in intensity of said DC magnetic field in said first direction and the intensity of the second magnetic field starting increase in number of said errors during increase in intensity of the DC magnetic field in said second direction are detected, and the average value between the detected intensities of said first and second magnetic fields is determined as the intensity of said influence magnetic field.

4. The method of detecting the magnetic field intensity according to claim 2, wherein a random data pattern recorded on said magneto-optical record medium is reproduced in said first and third steps.

* * * * *